United States Patent
Chao et al.

(10) Patent No.: US 11,202,101 B2
(45) Date of Patent: Dec. 14, 2021

(54) GROUPED CODING FOR PALETTE SYNTAX IN VIDEO CODING

(71) Applicant: QUALCOMM Incorporated, San Diego, CA (US)

(72) Inventors: Yung-Hsuan Chao, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/815,605

(22) Filed: Mar. 11, 2020

(65) Prior Publication Data
US 2020/0296423 A1    Sep. 17, 2020

Related U.S. Application Data

(60) Provisional application No. 62/817,946, filed on Mar. 13, 2019, provisional application No. 62/818,455, (Continued)

(51) Int. Cl.
*H04N 19/70* (2014.01)
*H04N 19/184* (2014.01)
*H04N 19/50* (2014.01)

(52) U.S. Cl.
CPC ......... *H04N 19/70* (2014.11); *H04N 19/184* (2014.11); *H04N 19/50* (2014.11)

(58) Field of Classification Search
CPC ....... H04N 19/70; H04N 19/184; H04N 19/50
See application file for complete search history.

(56) References Cited

U.S. PATENT DOCUMENTS

2015/0381994 A1* 12/2015 Yu .................. H04N 19/186
                                                  375/240.24
2016/0037164 A1*  2/2016 Joshi ............... H04N 19/129
                                                  375/240.02
(Continued)

FOREIGN PATENT DOCUMENTS

EP          3143767 A1      3/2017
WO       2015192800 A1     12/2015
(Continued)

OTHER PUBLICATIONS

S. Ye, Z. Chen, W. Zhang and L. Xu, "Parallel palette mode decoding for HEVC SCC," 2016 IEEE International Symposium on Circuits and Systems (ISCAS), Montreal, QC, Canada, 2016, pp. 2551-2554, doi: 10.1109/ISCAS.2016.7539113. (Year: 2016).*
(Continued)

*Primary Examiner* — Michael Robert Cammarata
(74) *Attorney, Agent, or Firm* — Shumaker & Sieffert, P.A.

(57) ABSTRACT

A video decoder may divide a current coding unit (CU) of video data into a plurality of index groups. The video decoder may decode syntax elements common to all of the index groups and then separately and sequentially decode syntax elements for each of the index groups. By first decoding the syntax elements used by all the index groups and then separately grouping the decoding of the syntax elements for the index groups, the video decoder may begin the construction process of some samples of the current CU without having to wait to complete decoding of all of the syntax elements of the current CU. As such, the techniques of this disclosure may decrease the amount of time required and/or the delay introduced by the decoding process.

20 Claims, 12 Drawing Sheets

Related U.S. Application Data filed on Mar. 14, 2019, provisional application No. 62/888,061, filed on Aug. 16, 2019.

(56) References Cited

U.S. PATENT DOCUMENTS

| | | | | |
|---|---|---|---|---|
| 2016/0100184 | A1* | 4/2016 | Liu | H04N 19/463 |
| | | | | 382/166 |
| 2016/0227217 | A1* | 8/2016 | Karczewicz | H04N 19/124 |
| 2016/0345030 | A1* | 11/2016 | Karczewicz | H04N 19/124 |
| 2016/0373745 | A1* | 12/2016 | Joshi | H04N 19/13 |
| 2016/0373756 | A1* | 12/2016 | Yu | H04N 19/176 |
| 2017/0127058 | A1* | 5/2017 | Misra | H04N 19/105 |
| 2017/0171560 | A1* | 6/2017 | Kim | H04N 19/176 |
| 2017/0195676 | A1* | 7/2017 | Chuang | H04N 19/11 |
| 2017/0310977 | A1* | 10/2017 | Laroche | H04N 19/176 |
| 2017/0374366 | A1* | 12/2017 | Xiu | H04N 19/129 |
| 2018/0014034 | A1* | 1/2018 | Lai | H04N 19/593 |
| 2018/0041774 | A1* | 2/2018 | Zhu | H04N 19/593 |
| 2018/0098093 | A1* | 4/2018 | Ye | H04N 19/593 |
| 2018/0152714 | A1* | 5/2018 | Sun | H04N 19/70 |
| 2019/0116380 | A1* | 4/2019 | Chuang | H04N 19/593 |

FOREIGN PATENT DOCUMENTS

| | | |
|---|---|---|
| WO | 2016074627 A1 | 5/2016 |
| WO | 2016127889 A1 | 8/2016 |
| WO | 2016146076 A1 | 9/2016 |
| WO | 2016187567 A2 | 11/2016 |
| WO | 2016192678 A1 | 12/2016 |

OTHER PUBLICATIONS

Y. Sun et al., "Improvements of HEVC SCC Palette Mode and Intra Block Copy," in IEEE Journal on Emerging and Selected Topics in Circuits and Systems, vol. 6, No. 4, pp. 433-445, Dec. 2016, doi: 10.1109/JETCAS.2016.2598193. (Year: 2016).*
X. Xiu et al., "Palette-Based Coding in the Screen Content Coding Extension of the HEVC Standard," 2015 Data Compression Conference, 2015, pp. 253-262, doi: 10.1109/DCC.2015.79. (Year: 2015).*
Chao Y., et al., "CE8: Palette Mode in HEVC (CE8-2.1)", JVET-N0344, Joint Video Experts Team (JVET) of ITU-T SG 16 WP 3 and ISO/IEC JTC 1/SC 29/WG 11, JVET-N0344, 14th Meeting: Geneva, CH, Mar. 19-27, 2019, pp. 8.
JVET: "VTM-4.0, Tags, JVET/VVCSoftware_VTM, GitLab", Frank Bossen, https://vcgit.hhi.fraunhofer.de/jvet/VVCSoftware_VTM/-/tags/VTM-4.0, Retrieved Jun. 3, 2020, pp. 1-2.
Xu X "Description of Core Experiment 8 (CE8): Screen Content Coding Tools", Joint Video Experts Team (JVET) of ITU-T SG 16 WP 3 and ISO/IEC JTC 1/SC 29/WG 11, Document: JVET-M1028-v4, 13th Meeting: Marrakech, MA, Jan. 9-18, 2019, pp. 1-18.
Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v6, 301 Pages.
Bross B., et al., "Versatile Video Coding (Draft 7)" Joint Video Experts Team (JVET) of ITU-T SG 16 WP 3 and ISO/IEC JTC 1/SC 29/WG 11, Document: JVET-P2001-VA, 16th Meeting: Geneva, CH, Oct. 1-11, 2019, 495 Pages.
Chao Y., et al., "CE8-1.3: Line-based CG Palette Mode", Joint Video Experts Team (JVET) of ITU-T SG 16 WP 3 and ISO/IEC JTC 1/SC 29/WG 11, 16th Meeting: Geneva, CH, Oct. 1-11, 2019, JVET-P0077-V1, pp. 1-6.
Chao Y., et al., "CE8-2.4: Line-based CG Palette Mode", Doc: JVET-O0120, Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0120-v2, pp. 1-8.
Chao Y., et al., "CE8-related: Line-based CG Palette Mode", Doc: JVET-N0550, Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0550-v2, 4 Pages.
Chao Y., et al., "CE8-related: Line-based CG Palette Mode", Doc: JVET-N0550-v1, Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0550-V1, 3 Pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.
Chen J., et al., "JVET-G1001: Algorithm Description ot Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2, sections 2.1.1.2.3.1.
Ergen S., "ZigBee/IEEE 802.15.4 Summary", Sep. 10, 2004, 37 Pages.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
"Information technology—Dynamic Adaptive Streaming over HTTP (DASH)—Part 1: Media Presentation Description and Segment Formats," ISO/IEC 23009-1, International Standard, Draft third edition, Jan. 9, 2017, 216 pp.
International Search Report and Written Opinion—PCT/US2020/022371—ISA/EPO—dated Jun. 2, 2020 (15 pp).
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Joshi R., et al., "Screen Content Coding Test Model 7 (SCM 7)", Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, JCTVC-W1014, pp. 1-14.
Karczewicz M., et al., "Non CE1: Grouping Palette Indices at Front", Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, JCTVC-T0065-r2, pp. 1-3.
Ohm J-R., et al., "MPEG-4 Advanced Video Coding", MPEG Doc#: N7314, Jul. 2005, 11 Pages.
Sun Y., et al., "CE13-related: Adaptive QP to Improve Subjective Quality for PHEC", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0323, pp. 1-3.
Xu M., et al., "Non-CE6: Simplification on Escape Coding of Palette Mode in HEVC SCC", Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, JCTVC-S0150-r1, pp. 1-4.

* cited by examiner

FIG. 7

GROUPED CODING FOR PALETTE SYNTAX IN VIDEO CODING

This application claims the benefit of U.S. Provisional Application No. 62/817,946, filed Mar. 13, 2019, U.S. Provisional Application No. 62/818,455, filed Mar. 14, 2019, and U.S. Provisional Application No. 62/888,061, filed Aug. 16, 2019, the entire contents of each of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for palette mode coding of video data with reduced memory requirements. To code a coding unit of video data, a video coder may signal an index value for each sample in the coding unit and signal a palette that translates between the index values and sample values. Once a video decoder has decoded all the index values for a coding unit, the video decoder may utilize the palette to reconstruct the samples of the coding unit. As such, the video decoder needs to allocate enough memory to store all of the index values for the coding unit. Therefore, increases in coding unit size may require additional memory allocations, which may be undesirable.

In accordance with one or more techniques of this disclosure, a video coder may divide a coding unit into a plurality of coefficient groups and separately process the sample values for each coefficient group. For instance, a video coder may divide an 8×8 coding unit into four coefficient groups that each include 16 samples. The video coder may process one or more syntax elements that apply to all samples of the coding unit and then sequentially process the coefficient groups. In this way, the video coder may avoid having to simultaneously store index values for the entire coding unit. Also in this way, a video decoder may begin to reconstruct the samples of the coding unit from the index values of decoded coefficient groups before all coefficient groups, and thus all index values, have been decoded.

As one example, a method for coding video data includes dividing a current coding unit (CU) of video data into a plurality of index groups, the current CU of video data coded using palette mode; parsing syntax elements for a first index group of the plurality of index groups; after parsing the syntax elements for the first index group, parsing syntax elements for a second index group of the plurality of index groups; and reconstructing the current CU of video data based on the syntax elements for the first index group and the syntax elements for the second index group.

As another example, a device includes a memory storing video data; and one or more processors implemented in circuitry and configured to: divide a current CU of video data into a plurality of index groups, the current CU of video data coded using palette mode; parse, via the coded video bitstream, syntax elements for a first index group of the plurality of index groups; after parsing the syntax elements for the first index group, parse, via the coded video bitstream, syntax elements for a second index group of the plurality of index groups; and reconstruct the current CU of video data based on the syntax elements for the first index group and the syntax elements for the second index group.

As another example, a device includes means for dividing a current CU of video data into a plurality of index groups, the current CU of video data coded using palette mode; means for parsing, via the coded video bitstream, syntax elements for a first index group of the plurality of index groups; means for parsing, after parsing the syntax elements for the first index group, via the coded video bitstream, syntax elements for a second index group of the plurality of index groups; and means for reconstructing the current CU of video data based on the syntax elements for the first index group and the syntax elements for the second index group.

As another example, a computer-readable storage medium stores instructions that, when executed, cause one or more processors of a video coder to: divide a current CU of video data into a plurality of index groups, the current CU of video data coded using palette mode; parse, via a coded video bitstream, syntax elements for a first index group of the plurality of index groups; after parsing the syntax elements for the first index group, parse, via the coded video bitstream, syntax elements for a second index group of the plurality of index groups; and reconstruct the current CU of video data based on the syntax elements for the first index group and the syntax elements for the second index group.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 7 is a conceptual diagram illustrating example coding of indices using horizontal and vertical traverse scans.

DETAILED DESCRIPTION

Figure 1:
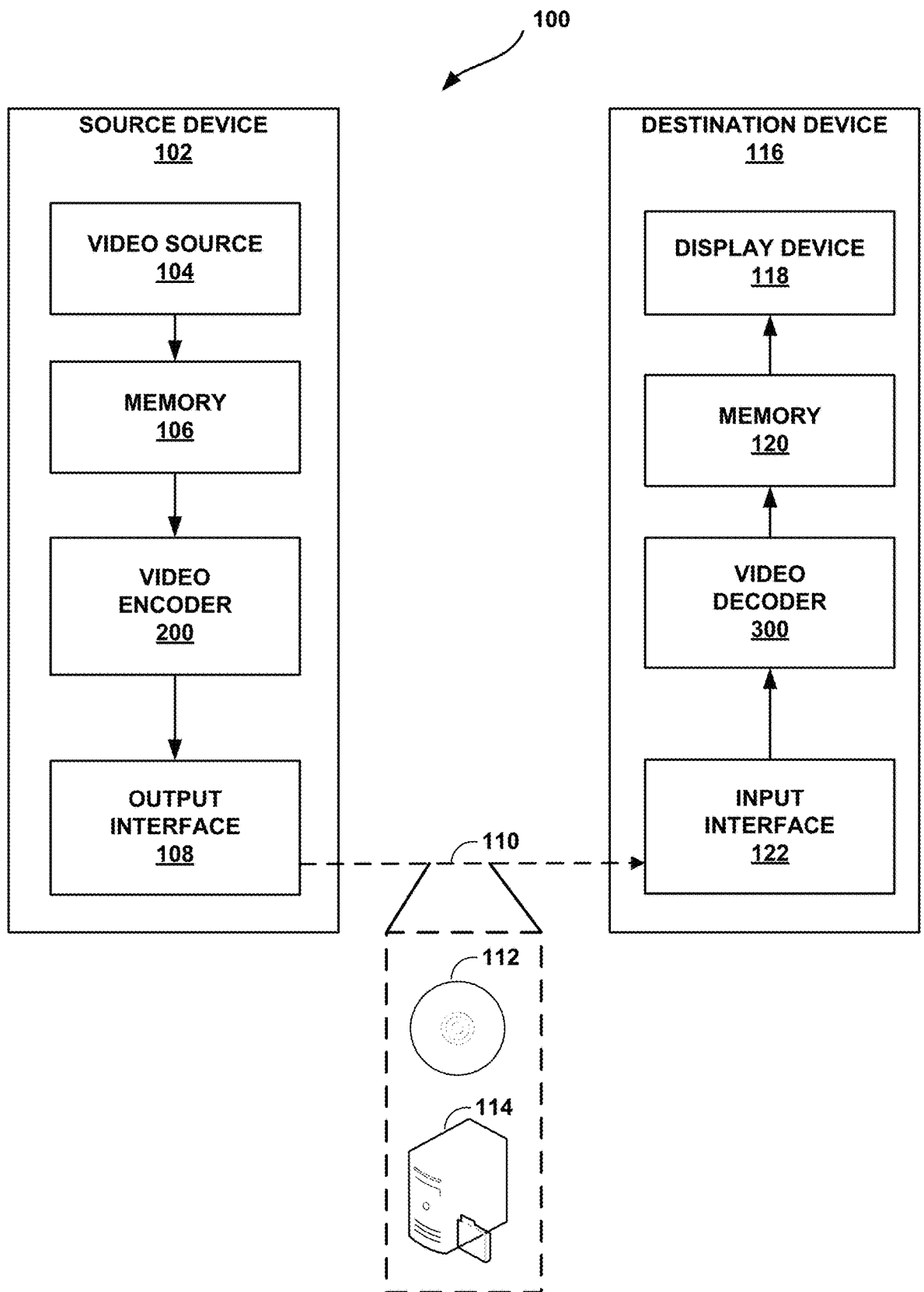
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for subblock coding in a palette mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for subblock coding in a palette mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream from computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, M A, 9-18 Jan. 2019, JVET-M1001-v6 (hereinafter "VVC Draft 4"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM, VVC, or AV1. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×6 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In the affine motion compensation mode, video encoder 200 may determine two or more motion vectors that represent a non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure describes techniques for video coding and compression. In particular, this disclosure describes techniques for palette-based coding of video data. For instance, this disclosure describes techniques to support coding of video content, especially screen content with palette coding, such as techniques for improved palette index binarization, and techniques for signaling for palette coding.

In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content may be the dominant content to be compressed. This type of content tends to have discrete-tone and feature sharp lines, and high contrast object boundaries. The assumption of continuous-tone and smoothness may no longer apply and thus traditional video coding techniques may not be efficient ways to compress.

Based on the characteristics of screen content video, palette coding is introduced to improve screen content coding (SCC) efficiency as proposed in Guo et al., "Palette Mode for Screen Content Coding," Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0323, available at http://phenix.it-sudparis.eu/jct/doc_end_user/documents/13_Incheon/wg11/CTVC-M0323-v3.zip, (hereinafter "JCTVC-M0323"). Specifically, palette coding introduces a lookup table, i.e., a color palette, to compress repetitive pixel values based on the fact that in SCC, colors within one CU usually concentrate on a few peak values. Given a palette for a specific CU, pixels within the CU are mapped to palette indices. In the second stage, an effective copy from left run length method is proposed to effectively compress the index block's repetitive pattern. In some examples, the palette index coding mode may be generalized to both copy from left and copy from above with run length coding. Note that, in some examples, no transformation process may be invoked for palette coding to avoid blurring sharp edges which can have a huge negative impact on visual quality of screen contents.

As discussed above, this disclosure describes palette-based coding, which may be particularly suitable for screen generated content coding. For example, assume a particular area of video data has a relatively small number of colors. A video coder (e.g., video encoder 200 and/or video decoder 300) may code a so-called "palette" as a table of colors for representing the video data of the particular area (e.g., a given block). Each pixel may be associated with an entry in the palette that represents the color of the pixel. For example, the video coder may code an index that maps the pixel value to the appropriate value in the palette.

In the example above, video encoder 200 may encode a block of video data by determining a palette for the block, locating an entry in the palette to represent the color value of each pixel, and encoding the palette with index values for the pixels mapping the pixel value to the palette. Video decoder 300 may obtain, from an encoded bitstream, a palette for a block, as well as index values for the pixels of the block. Video decoder 300 may map the index values of the pixels to entries of the palette to reconstruct the luma and chroma pixel values of the block.

The example above is intended to provide a general description of palette-based coding. In various examples, the techniques described in this disclosure may include techniques for various combinations of one or more of signaling palette-based coding modes, transmitting palettes, predicting palettes, deriving palettes, and transmitting palette-based coding maps and other syntax elements. Such techniques may improve video coding efficiency, e.g., requiring fewer bits to represent screen generated content.

For example, according to aspects of this disclosure, a video coder (video encoder 200 and/or video decoder 300) may code one or more syntax elements for each block that is coded using a palette coding mode. For example, the video coder may code a palette_mode_flag to indicate whether a palette-based coding mode is to be used for coding a particular block. In this example, a video encoder may encode a palette_mode_flag with a value that is equal to one to specify that the block currently being encoded ("current block") is encoded using a palette mode. In this case, a video decoder may obtain the palette_mode_flag from the encoded bitstream and apply the palette-based coding mode to decode the block. In instances in which there is more than one palette-based coding mode available (e.g., there is more than one palette-based technique available for coding), one or more syntax elements may indicate one of a plurality of different palette modes for the block.

In some instances, video encoder 200 may encode a palette_mode_flag with a value that is equal to zero to specify that the current block is not encoded using a palette mode. In such instances, video encoder 200 may encode the block using any of a variety of inter-predictive, intra-predictive, or other coding modes. When the palette_mode_flag is equal to zero, video encoder 200 may encode additional information (e.g., syntax elements) to indicate the specific mode that is used for encoding the respective block. In some examples, as described below, the mode may be an HEVC coding mode. The use of the palette_mode_flag is described for purposes of example. In other examples, other syntax elements such as multi-bit codes may be used to indicate whether the palette-based coding mode is to be used for one or more blocks, or to indicate which of a plurality of modes are to be used.

When a palette-based coding mode is used, video encoder 200 may encode a representation of a palette in the encoded video data bitstream (e.g., for use by video decoder 300). Video encoder 200 may encode a palette for each block or may encode a palette to be shared among a number of blocks in a picture or slice. The palette may refer to a number of pixel values that are dominant and/or representative for the block, including, e.g., a luma value and two chroma values.

In some examples, video encoder 200 may encode a syntax element, such as a transpose flag, to indicate whether a transpose process is applied to palette indices of a current palette. If the transpose flag is zero, the palette indices for samples may be coded in a horizontal traverse scan. Similarly, if the transpose flag is one, the palette indices for samples may be coded in a vertical traverse scan. This can be thought of as decoding the index values assuming a horizontal traverse scan and then transposing the block (rows to columns).

As discussed above, palette coding is designed to handle the clustering colors for screen contents. Palette coding employs base colors and an index map to represent the input image block. Video encoder 200 may encode a flag for each coding unit (CU) to signal whether the palette mode is used in the current CU. If the palette mode is utilized, the pixel values in the CU are represented by a small set of representative color values. The set is referred to as the palette. For pixels with values close to the palette colors, the palette indices are signalled. For pixels with values outside the palette, the pixel is denoted with an escape symbol and the quantized pixel values are signaled directly.

To decode a palette encoded block, video decoder 300 needs to decode palette colors and indices. Palette colors are described by a palette table and encoded by palette table coding tools. Video encoder 200 may signal an escape flag for each CU to indicate if escape symbols are present in the current CU. If escape symbols are present, video decoder 300 may augment the palette table by one and assign the last index to the escape mode. Palette indices of all pixels in a CU form a palette index map and are encoded by palette index map coding tools.

Figure 7:
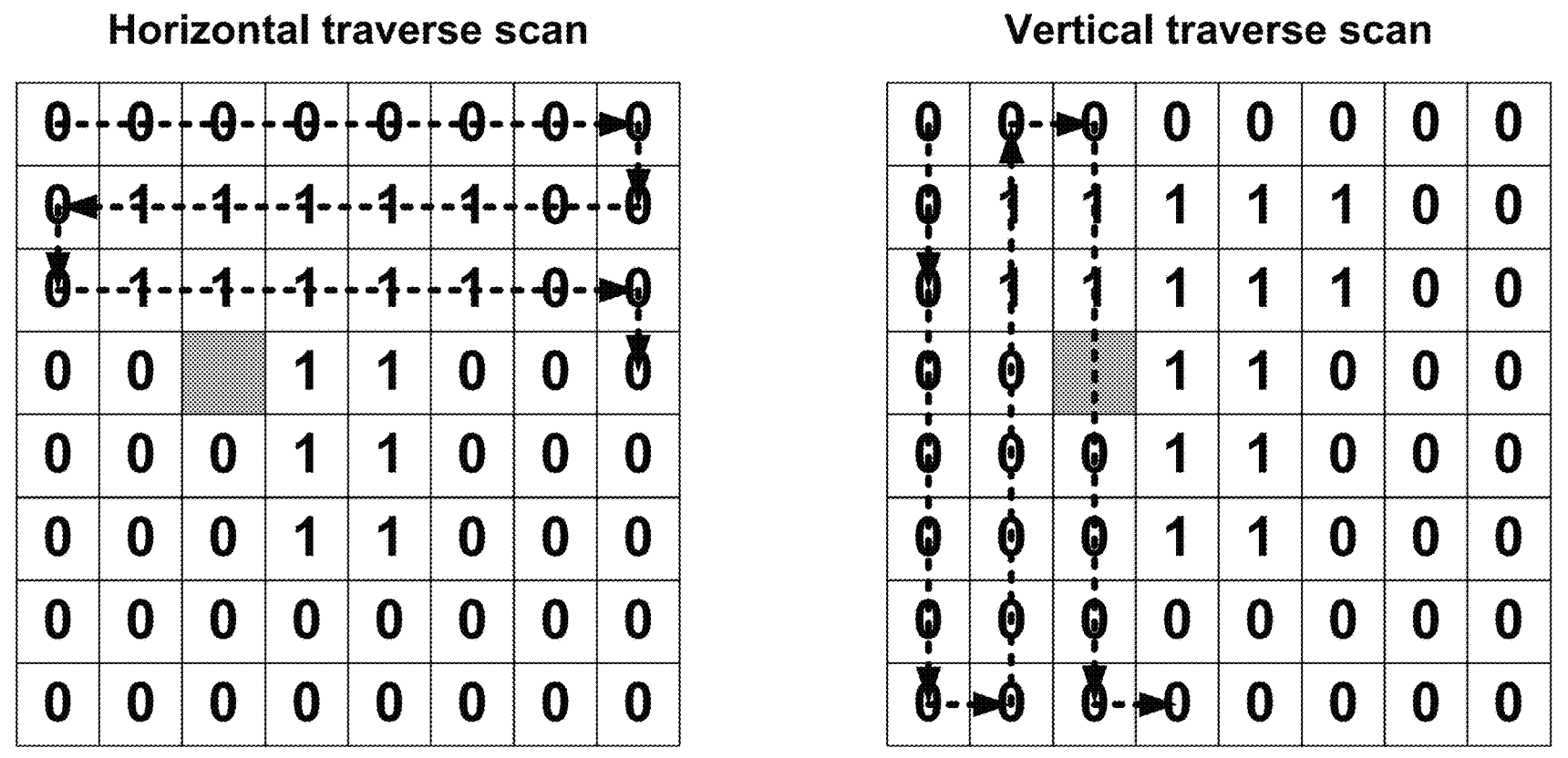

For coding the palette index map, the video coder may code the indices using horizontal and vertical traverse scans. FIG. 7 is a conceptual diagram illustrating example coding of indices using horizontal and vertical traverse scans.

Video encoder 200 and/or video decoder 300 may signal (e.g., video encoder 200 may encoder and video decoder 300 may decode) the palette indices using two main palette sample modes: 'INDEX' and 'COPY_ABOVE'. Video encoder 200 and/or video decoder 300 may signal the mode using a flag except for the top row when horizontal scan is used, the first column when the vertical scan is used, or when the previous mode was 'COPY_ABOVE'. In the 'COPY_ABOVE' mode, video encoder 200 and/or video decoder 300 may copy the palette index of the sample in the row above. In the 'INDEX' mode, video encoder 200 and/or video decoder 300 may explicitly signal the palette index. For both 'INDEX' and 'COPY_ABOVE' modes, video encoder 200 and/or video decoder 300 may signal a run value which specifies the number of pixels that are coded using the same mode.

The encoding order for an index map may be as follows: First, video encoder 200 and/or video decoder 300 may signal the number of index values for the CU. video encoder 200 and/or video decoder 300 may follow this by signaling of the actual index values for the entire CU using truncated binary coding. video encoder 200 and/or video decoder 300 may code both the number of indices as well as the index values in bypass mode. This groups the index-related bypass bins together. Then video encoder 200 and/or video decoder 300 may signal the palette mode (INDEX or COPY_ABOVE) and run value in an interleaved manner. Finally, video encoder 200 and/or video decoder 300 may group the component escape values corresponding to the escape samples for the entire CU together and signal the same in bypass mode. Video encoder 200 and/or video decoder 300 may signal an additional syntax element (e.g., last_run_type_flag) after signaling the index values. This syntax element, in conjunction with the number of indices, may eliminate the need to signal the run value corresponding to the last run in the block.

Previous palette mode designs may present one or more disadvantages. For instance, in the palette mode design in HEVC, palette indices for a whole CU are grouped and parsed before being used to parse the run type and run length information. This means a buffer of indices must be maintained. In the worst case the number of indices needed to be stored is equivalent to the number of pixels in a CU. The buffer requirement can be a burden for hardware implementation since in the HEVC and VVC, the maximum CU size can go up to 64 and 128. In addition, to reconstruct a pixel of escape mode, the decoder must first parse indices and run information for the whole CU before parsing the escape mode, which may slow down the reconstruction pipeline.

In accordance with the techniques of this disclosure, a video coder, such as video encoder 200 or video decoder 300, may divide a current block of video data into a plurality of index groups, the current block of video data coded using palette mode; parse syntax elements for a first index group of the plurality of index groups; after parsing the syntax elements for the first index group, parse syntax elements for a second index group of the plurality of index groups; and decode the current block of video data based on the syntax elements for the first index group and the syntax elements for the second index group.

Figure 8:
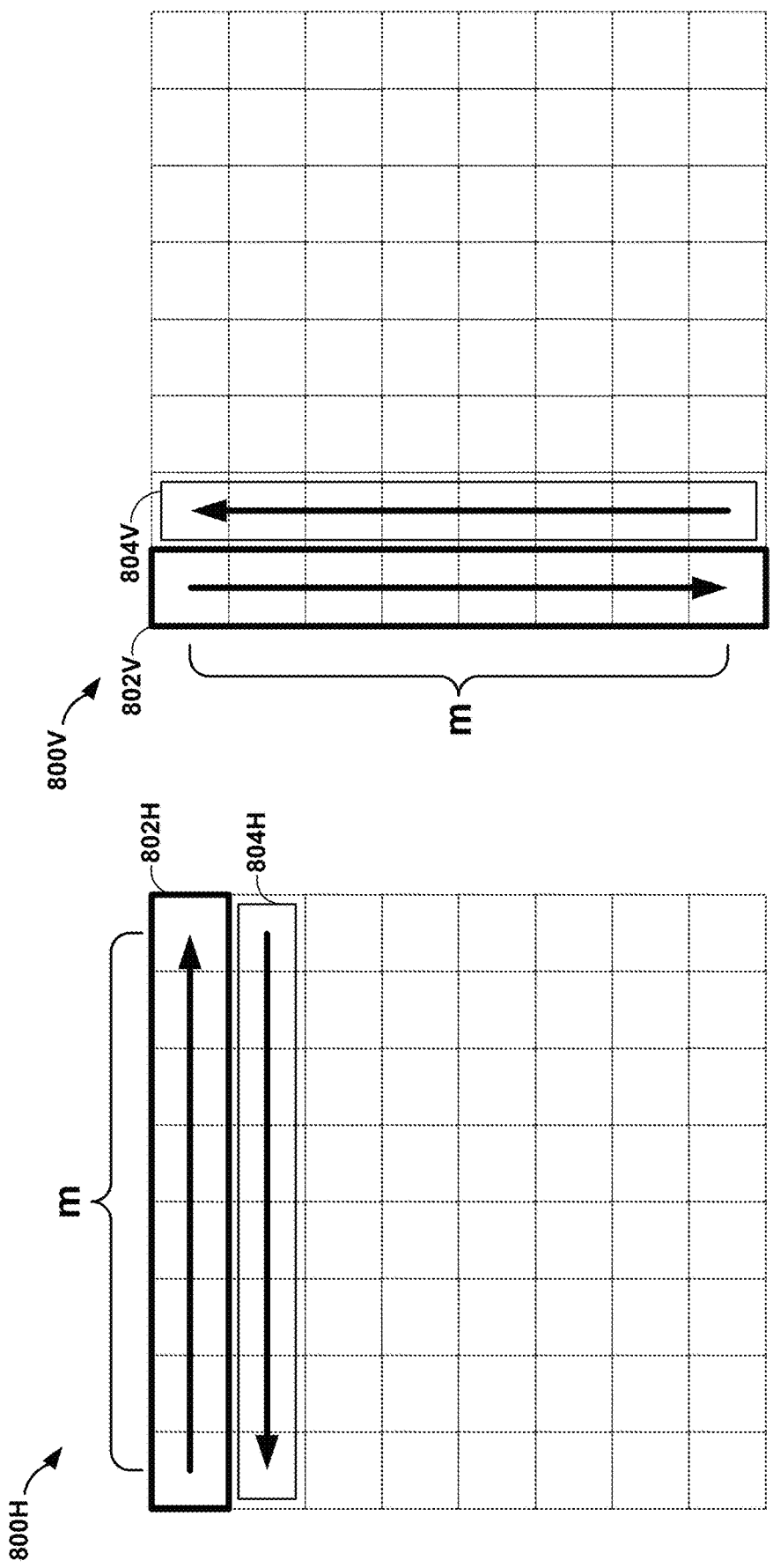
FIG. 8 is a conceptual diagram illustrating sub-block based index map scanning for palette-mode coding of video data, in accordance with one or more techniques of this disclosure.

FIG. 8 is a conceptual diagram illustrating sub-block based index map scanning for palette-mode coding of video data, in accordance with one or more techniques of this disclosure. FIG. 8 includes two examples of sub-block partition for palette index map scanning based on scanning mode, horizontal traverse scan example 800H and vertical traverse scan example 800V. As shown in FIG. 8, m pixels are grouped as one index group (IG) (e.g., IG 802H or IG 802V). A video coder may perform the parsing of palette syntax necessary for construction for pixels in one IG before parsing the next IG. For instance, a video coder may perform the parsing of palette syntax necessary for construction for pixels in IG 802H before performing the parsing of palette syntax necessary for construction for pixels in IG 804H. Similarly, a video coder may perform the parsing of palette syntax necessary for construction for pixels in IG 802V before performing the parsing of palette syntax necessary for construction for pixels in IG 804V. As can be seen in the example of FIG. 8, the grouping of pixels into index groups may be performed along the rows/columns of the scan order (e.g., the scans shown in FIG. 7). In some examples, the video coder may handle the parsing of palette indices, run type/length, and escape quantized colors differently (e.g., due to the sub-block partitioning and as compared to the palette operations of HEVC).

As one example, for each IG, the video coder may parse the number of palette indices and the index values for all pixels in the group at the beginning. Then, for each pixel, the video coder may parse one bin index_copy_flag, which indicates if the pixel's index value is the same as the previous index, i.e., if the previous scanned pixel and the current pixel are both of run type COPY_ABOVE or if the previous scanned pixel and the current pixel are both of run type INDEX and the index value is the same. If the index is different from the previous index, the video coder may parse one bin run_type_flag to indicate which run type, i.e., INDEX or COPY_ABOVE, the current pixel corresponds to. The video coder may context code the run_type_flag using one context or the context can be different depending on the previous run type. The video coder may parse the run_type_flag right after parsing index_copy_flag of the current pixel, or can parse the run_type_flag all together after parsing index_copy_flag of all pixels in the IG. The video coder may code index_copy_flag as a context coded bin.

As one example, the video coder may determine the context based on a run type (e.g., the last parsed run type). For instance, a different run type can use its own individual context. In another case, different run types can share the same context.

As another example, the video coder may determine the context based on index values. For instance, in the condition that totally k indices (e.g., a total of k indices) are parsed at the beginning, and m INDEX run types are parsed before the current pixel, if the last parsed run type is INDEX, the context can be determined based on its associated index value ($m^{th}$ index value) or an average of the $m^{th}$ index value and the $(m+1)^{th}$ index values. If the last parsed run type is COPY_ABOVE, the context can be based on the $(m+1)^{th}$ index value. The video coder may determine the context as follows: As one example, index values smaller than threshold $T_1$ are assigned context A, index values larger than $T_1$ and smaller than threshold $T_2$ are assigned context B, and the rest of index values are of context C. As another example, for index values smaller than a threshold $T_1$, each index value has its own context; for index values larger or equal to $T_1$, one context is shared.

As another example, the video coder may determine the context based on the distance of the pixel from the last pixel with index_copy_flag=0 (assuming index_copy_flag=0 if the index is different from the previous one and index_copy_flag=1 otherwise). In one case, context A is assigned if the distance is 1, context B is assigned if the distance is 2, context C is assigned if the distance is 3, etc. . . . For pixels with distances larger than S, one context is shared. In another case, for pixels of distances smaller than S, context A is used, and for pixels of distance larger than S, context B is used.

As another example, the video coder may determine the context based on the size of palette in the current CU and the number of pixels in the CU. For instance, if the palette size is larger than L, context A is used and if the palette size is smaller than L, context B is used.

As another example, the video coder may determine the context based on the combination of the run type, index value, pixel position, and palette size, or a subset of the run type, index value, pixel position, and palette size.

In some examples, the video coder may group the parsing of quantized colors of escape mode pixels in the IG after the parsing of run type and index_copy_flag. For instance, for each IG, the index values for pixels in the group may be parsed all together at the end, i.e., after run coding, or the index values can be interleaved with run coding, i.e., after parsing the run information of the corresponding pixel. For run coding of each pixel, one bin index_copy_flag may be parsed, which indicates if the pixel's index value is the same as the previous index, i.e., if the previous scanned pixel and the current pixel are both of run type COPY_ABOVE or if the previous scanned pixel and the current pixel are both of run type INDEX and the index value is the same. If the index is different from the previous index, the video coder may parse a one bin run_type_flag to indicate which run type, i.e., INDEX or COPY_ABOVE, the current pixel corresponds to. The video coder may context code the run_type_flag using one context or the context can be different depending on the previous run type. A run_type_flag can be parsed right after parsing index_copy_flag of the current pixel, or it can be parsed all together after parsing index_copy_flag of all pixels in the IG. The video coder may code the bin index_copy_flag as a context coded bin.

As one example, the video coder may determine the context based on run type. In one case, different run type can use its own individual context. In another case, different run types can share the same context.

As another example, the video coder may determine the context based on the distance of the pixel from the last pixel with index_copy_flag=0 (assuming index_copy_flag=0 if the index is different from the previous one and index_copy_flag=1 otherwise). In one case, context A is assigned if the distance is 1, context B is assigned if the distance is 2, context C is assigned if the distance is 3, etc. . . . For pixels with distances larger than S, one context is shared. In another case, for pixels of distances smaller than S, context A is used, and for pixels of distance larger than S, context B is used.

As another example, the video coder may determine the context based on the size of palette in the current CU and the number of pixels in the CU. For instance, if the palette size is larger than L, context A is used and if the palette size is smaller than L, context B is used.

As another example, the video coder may determine the context based on the combination of the run type, pixel position, and palette size, or the subset of them.

In some examples, after run coding, the values of indices for runs using INDEX mode may be parsed. The binarization can be based on the associated run length, previous parsed index value, palette size, or the number of pixels in the CU. In one example, binarization method $B_1$ is used if the run length is smaller than L, and binarization method $B_2$ is used if the run length is larger than L. In yet another example, binarization method $B_1$ is used if the run length is larger than L and if the palette size is smaller than P, binarization method $B_2$ is used if the run length is larger than L and if the palette size is larger than P, and binarization method $B_3$ is used if the run length is smaller than L.

The binarization can be of truncated binary code, unary code, exponential Golomb code, Golomb rice code, the combination of these, or a flag plus any of these binarization codewords.

As one example, if the run length is larger than L and if the palette size is larger than P, the video coder may determine the binarization based on unary code up to a certain value and Golomb rice code of parameter 1 is used for the remainder; if the run length is larger than L and if the palette size is smaller than P, the binarization is based on unary code up to a certain value and Golomb rice code of parameter 0 is used for the remainder; If the run length is smaller than L, the binarization may be based on Golomb rice code of parameter 3.

As another example, if the run length is larger than L, the video coder may signal a flag indicating if the index value is 0. If the index is larger than 0, Golomb rice code of parameter 1 is used for binarization of (index−1). If the run length is smaller than L, the binarization may be based on Golomb rice code of parameter 3.

In some examples, the video coder may parse the run type first for the first pixel in the first IG. Then, the video coder may binarize the run length using unary codeword, i.e. for run length=6, the codeword will be 5 zeros followed by a 1 at the end. Each bin in the codeword can be coded as a context coded bin:

As one example, the video coder may determine the context based on the run type. For example, a different run type can use its own individual context. In another example, different run types can share the same context.

As another example, the video coder may determine the context based on index values if the index values are parsed before run coding and if the associated run type is INDEX. In one case, index values smaller than threshold $T_1$ are assigned context A, index values larger than $T_1$ and smaller than threshold $T_2$ are assigned context B, and the rest of index values are of context C. In yet another case, for index value smaller than a threshold $T_1$, each index value has its own context; for index value larger or equal to $T_1$, one context is shared.

As another example, the video coder may determine the context based on the order of the bin in the codeword. For example, context A is assigned if the order is 1, context B is assigned if the order is 2, context C is assigned if the order is 3, etc. . . . For pixels with orders larger than S, one context may be shared.

As another example, the video coder may determine the context based on the size of palette in the current CU and the number of pixels in the CU. For example, if the palette size is larger than L, context A is used and if the palette size is smaller than L, context B is used.

As another example, the video coder may determine the context based on the combination of the run type, index value, pixel/bin order in the codeword, and palette size, or the subset of them.

In some examples, the video coder may parse an index group (IG) flag (e.g., sigIG_flag or other type of syntax element) before parsing the palette index of one IG, indicating if there is at least one pixel in the IG with a different index from the previous pixel, i.e., if the previous scanned pixel and the current pixel are of different run type or if the previous scanned pixel and the current pixel are both of run type INDEX but the index values are different. If there is no pixel of an index different from the previous index, no parsing may need to be processed for the IG if none of the pixels are coded using escape mode. For instance, if none of the pixels are coded using escape mode, signaling/parsing for run_type_flag and index_copy_flag, index values and quantized escape colors may be omitted. If there is no pixel of index different from the previous index but pixels of escape modes are present (e.g., exist), only those quantized colors need to be parsed. sigIG_flag can be coded with context coded bin or bypass bins if the context bin limit is reached (currently in VVC, the limit of number of context coded bins per sample is set to 1.75 for coding transformed coefficients. Once the limit is reached, all syntax elements for coefficient coding may be bypass coded). For context modeling for sigIG_flag, in one example, one context (aside from other contexts in palette syntax) can be assigned for all sigIG_flag. In another example, the context modeling for sigIG_flag can depend on the previously coded sigIG_flag within the same coding unit (CU), e.g. two contexts are assigned for the cases when the previous coded IG has sigIG_flag=0 or 1. In yet another example, the context modeling for sigIG_flag can depend on the sigIG_flag of the neighboring IGs (e.g. left and above IGs) within the same CU, e.g. three contexts are assigned for the cases when neither of the above and left IGs has sigIG_flag=1, one of the above and left IGs has sigIG_flag=1, and both the above and left IGs has sigIG_flag=1.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
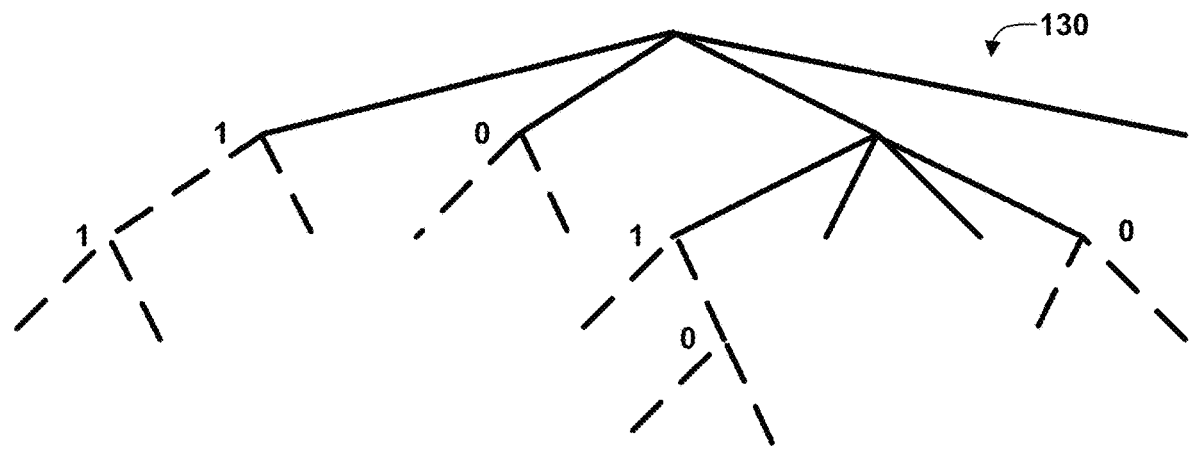
FIGS. 2A and 2B are conceptual diagrams illustrating an example quadtree binary tree (QTBT) structure, and a corresponding coding tree unit (CTU).
Figure 2B:
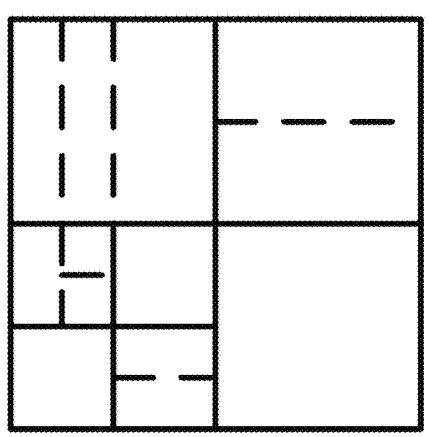

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further horizontal splitting is permitted. Similarly, a binary tree node having a height equal to MinBTSize implies that no further vertical splitting is permitted for that binary tree node. As noted above, leaf nodes of the binary tree are referred to as CUs, and are further processed according to prediction and transform without further partitioning.

Figure 3:
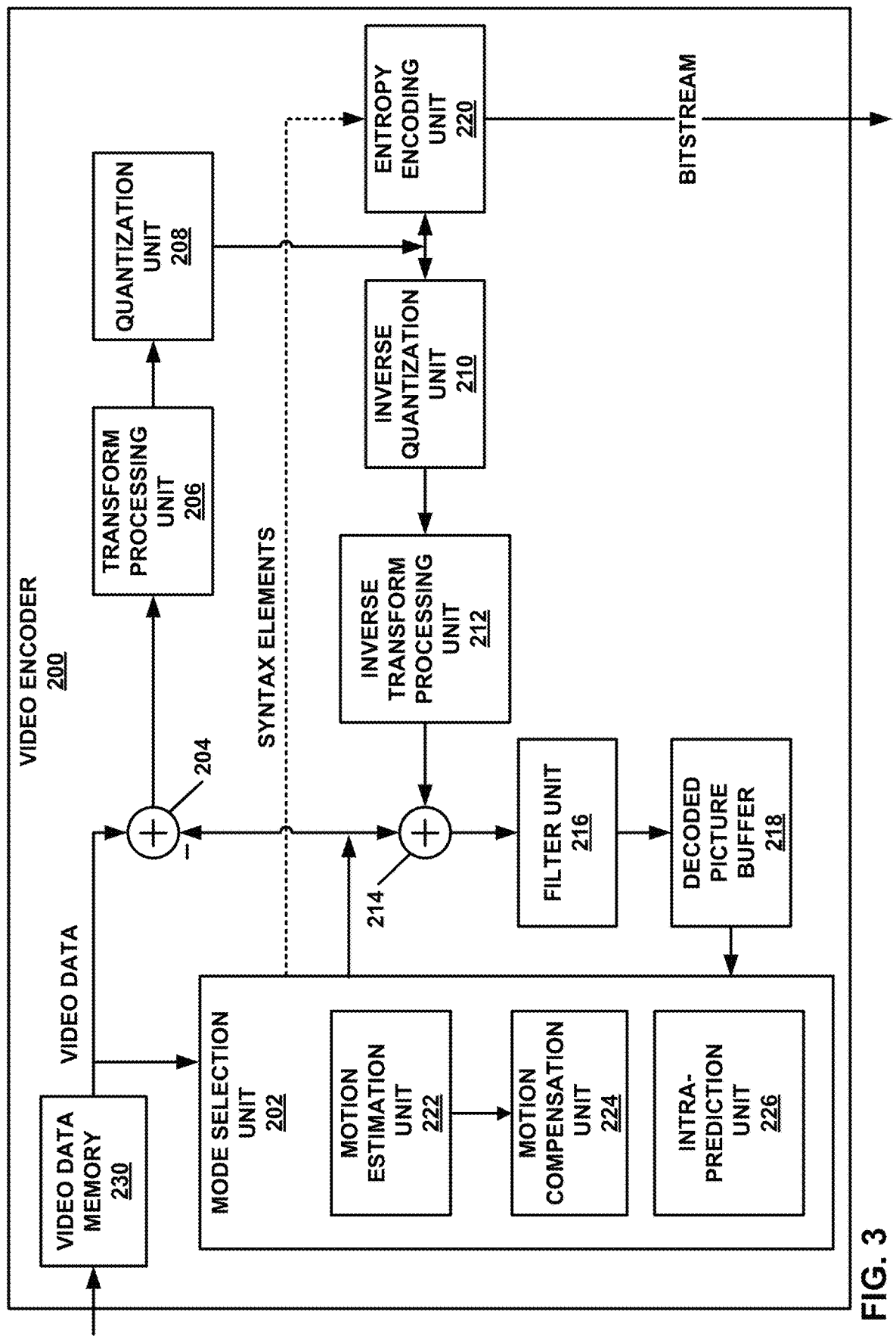
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that causes the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to divide a current block of video data into a plurality of index groups, the current block of video data coded using palette mode; parse syntax elements for a first index group of the plurality of index groups; after parsing the syntax elements for the first index group, parse syntax elements for a second index group of the plurality of index groups; and decode the current block of video data based on the syntax elements for the first index group and the syntax elements for the second index group.

Figure 4:
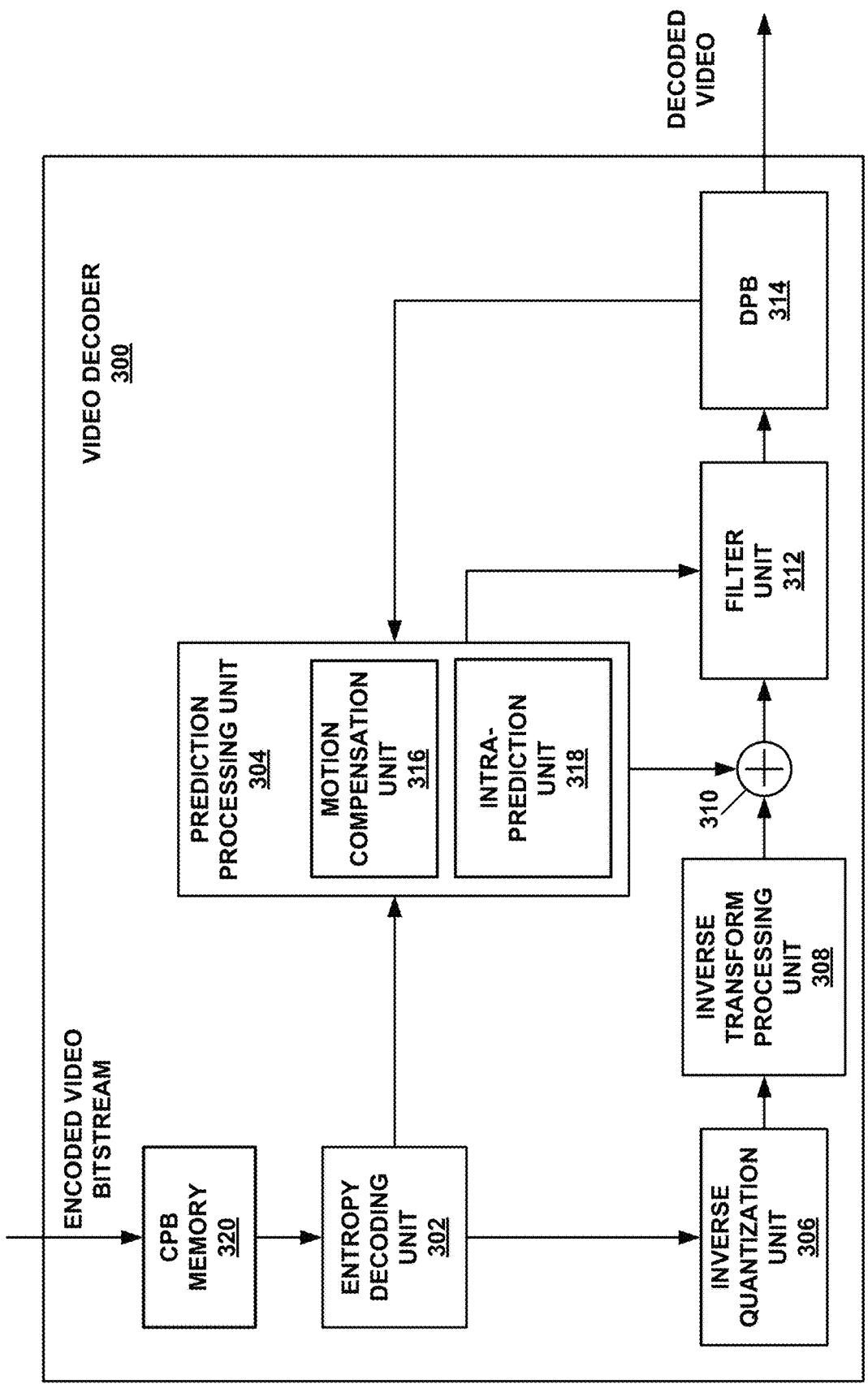
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, video decoder 300 is described according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that causes the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to divide a current block of video data into a plurality of index groups, the current block of video data coded using palette mode; parse syntax elements for a first index group of the plurality of index groups; after parsing the syntax elements for the first index group, parse syntax elements for a second index group of the plurality of index groups; and decode the current block of video data based on the syntax elements for the first index group and the syntax elements for the second index group.

Figure 5:
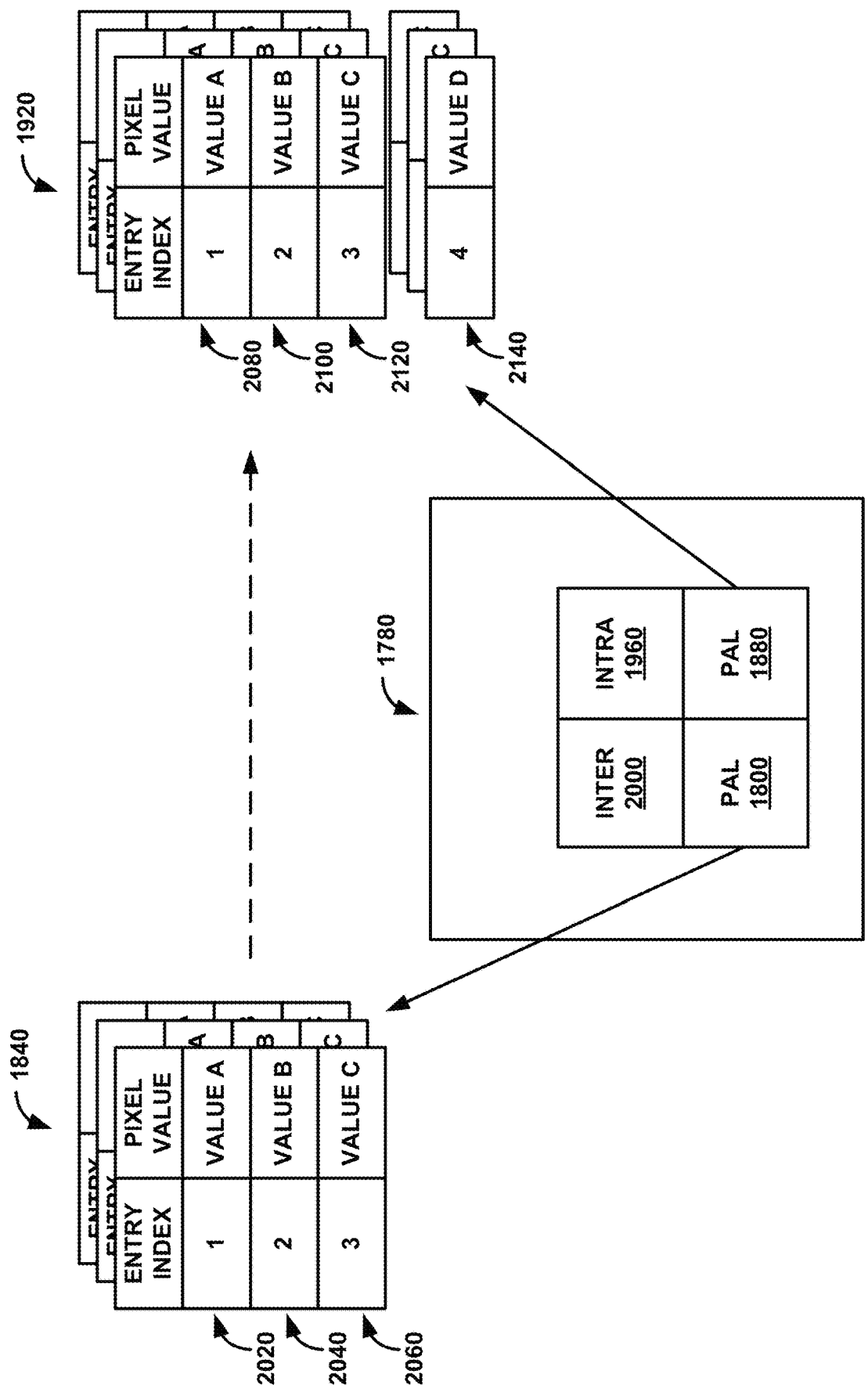
FIG. 5 is a conceptual diagram illustrating an example of determining a palette for coding video data, consistent with techniques of this disclosure.

FIG. 5 is a conceptual diagram illustrating an example of determining a palette for coding video data, consistent with techniques of this disclosure. The example of FIG. 5 includes a picture 1780 having a first coding unit (CU) 1800 that is associated with first palettes 1840 and a second CU 1880 that is associated with second palettes 1920. As described in greater detail below and in accordance with the techniques of this disclosure, second palettes 1920 are based on first palettes 1840. Picture 1780 also includes block 1960 coded with an intra-prediction coding mode and block 2000 that is coded with an inter-prediction coding mode.

The techniques of FIG. 5 are described in the context of video encoder 200 (FIG. 1 and FIG. 3) and video decoder 300 (FIG. 1 and FIG. 4) and with respect to the HEVC Standard for purposes of explanation. However, it should be understood that the techniques of this disclosure are not limited in this way, and may be applied by other video coding processors and/or devices in other video coding processes and/or standards (e.g., VVC).

In general, a palette refers to a number of pixel values that are dominant and/or representative for a CU currently being coded, such as CU 1880 in the example of FIG. 5. First palettes 1840 and second palettes 1920 are shown as including multiple palettes. In some examples, a video coder (such as video encoder 200 or video decoder 300) may code palettes separately for each color component of a CU. For example, video encoder 200 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU. In another example, video encoder 20 may encode a palette for a luma (Y) component of a CU, and another palette for two components (U, V) of the CU. In this example, entries of the Y palette may represent Y values of pixels of the CU, and entries of the U-V palette may represent U-V value pairs of pixels of the CU.

In other examples, video encoder 200 may encode a single palette for all color components of a CU. In this example, video encoder 200 may encode a palette having an i-th entry that is a triple value, including Yi, Ui, and Vi. In this case, the palette includes values for each of the components of the pixels. Accordingly, the representation of palettes 1840 and 1920 as a set of palettes having multiple individual palettes is merely one example and not intended to be limiting.

In the example of FIG. 5, first palettes 1840 includes three entries 2020-2060 having entry index value 1, entry index value 2, and entry index value 3, respectively. Entries 2020-2060 relate the index values to pixel values including pixel value A, pixel value B, and pixel value C, respectively. As described herein, rather than coding the actual pixel values of first CU 1800, a video coder (such as video encoder 200 or video decoder 300) may use palette-based coding to code the pixels of the block using the indices 1-3. That is, for each pixel position of first CU 1800, video encoder 200 may encode an index value for the pixel, where the index value is associated with a pixel value in one or more of first palettes 1840. Video decoder 300 may obtain the index values from a bitstream and reconstruct the pixel values using the index values and one or more of first palettes 1840. Thus, first palettes 1840 are transmitted by video encoder 200 in an encoded video data bitstream for use by video decoder 300 in palette-based decoding. In general, one or more palettes may be transmitted for each CU or may be shared among different CUs.

Video encoder 200 and video decoder 300 may determine second palettes 1920 based on first palettes 1840. For example, video encoder 200 may encode a pred_palette_flag for each CU (including, as an example, second CU 1880) to indicate whether the palette for the CU is predicted from one or more palettes associated with one or more other CUs, such as neighboring CUs (spatially or based on scan order) or the most frequent samples of a causal neighbor. For example, when the value of such a flag is equal to one, video decoder 300 may determine that second palettes 1920 for second CU 1880 are predicted from one or more already decoded palettes and therefore no new palettes for second CU 1880 are included in a bitstream containing the pred_palette_flag. When such a flag is equal to zero, video decoder 300 may determine that palette 1920 for second CU 1880 is included in the bitstream as a new palette. In some examples, pred_palette_flag may be separately coded for each different color component of a CU (e.g., three flags, one for Y, one for U, and one for V, for a CU in YUV video). In other examples, a single pred_palette_flag may be coded for all color components of a CU.

In the example above, the pred_palette_flag is signaled per-CU to indicate whether any of the entries of the palette for the current block are predicted. In some examples, one or more syntax elements may be signaled on a per-entry basis. That is, a flag may be signaled for each entry of a palette predictor to indicate whether that entry is present in the current palette. As noted above, if a palette entry is not predicted, the palette entry may be explicitly signaled.

When determining second palettes 1920 relative to first palettes 1840 (e.g., pred_palette_flag is equal to one), video encoder 200 and/or video decoder 300 may locate one or more blocks from which the predictive palettes, in this example first palettes 1840, are determined. The predictive palettes may be associated with one or more neighboring CUs of the CU currently being coded (e.g., such as neighboring CUs (spatially or based on scan order) or the most frequent samples of a causal neighbor), i.e., second CU 1880. The palettes of the one or more neighboring CUs may be associated with a predictor palette. In some examples, such as the example illustrated in FIG. 5, video encoder 200 and/or video decoder 300 may locate a left neighboring CU, first CU 1800, when determining a predictive palette for second CU 1880. In other examples, video encoder 200 and/or video decoder 300 may locate one or more CUs in other positions relative to second CU 1880, such as an upper CU, CU 1960.

Video encoder 200 and/or video decoder 300 may determine a CU for palette prediction based on a hierarchy. For example, video encoder 200 and/or video decoder 300 may initially identify the left neighboring CU, first CU 1800, for palette prediction. If the left neighboring CU is not available for prediction (e.g., the left neighboring CU is coded with a mode other than a palette-based coding mode, such as an intra-prediction mode or inter-prediction mode, or is located at the left-most edge of a picture or slice) video encoder 200 and/or video decoder 300 may identify the upper neighboring CU, CU 1960. Video encoder 200 and/or video decoder 300 may continue searching for an available CU according to a predetermined order of locations until locating a CU having a palette available for palette prediction. In some examples, video encoder 200 and/or video decoder 300 may determine a predictive palette based on multiple blocks and/or reconstructed samples of a neighboring block.

While the example of FIG. 5 illustrates first palettes 1840 as predictive palettes from a single CU, first CU 1800, in other examples, video encoder 200 and/or video decoder 300 may locate palettes for prediction from a combination of neighboring CUs. For example, video encoder 200 and/or video decoder 300 may apply one or more formulas, functions, rules or the like to generate a palette based on palettes of one or a combination of a plurality of neighboring CUs.

In still other examples, video encoder 200 and/or video decoder 300 may construct a candidate list including a number of potential candidates for palette prediction. A pruning process may be applied at both video encoder 200 and video decoder 300 to remove duplicated candidates in the list. In such examples, video encoder 200 may encode an index to the candidate list to indicate the candidate CU in the list from which the current CU used for palette prediction is selected (e.g., copies the palette). Video decoder 300 may construct the candidate list in the same manner, decode the index, and use the decoded index to select the palette of the corresponding CU for use with the current CU.

In an example for purposes of illustration, video encoder 200 and video decoder 300 may construct a candidate list that includes one CU that is positioned above the CU currently being coded and one CU that is positioned to the left of the CU currently being coded. In this example, video encoder 200 may encode one or more syntax elements to indicate the candidate selection. For example, video encoder 200 may encode a flag having a value of zero to indicate that the palette for the current CU is copied from the CU positioned to the left of the current CU. Video encoder 200 may encode the flag having a value of one to indicate that the palette for the current CU is copied from the CU positioned above the current CU. Video decoder 300 decodes the flag and selects the appropriate CU for palette prediction.

In still other examples, video encoder 200 and/or video decoder 300 determine the palette for the CU currently being coded based on the frequency with which sample values included in one or more other palettes occur in one or more neighboring CUs. For example, video encoder 200 and/or video decoder 300 may track the colors associated with the most frequently used index values during coding of a predetermined number of CUs. Video encoder 200 and/or video decoder 300 may include the most frequently used colors in the palette for the CU currently being coded.

In some examples, video encoder 200 and/or video decoder 300 may perform entry-wise based palette prediction. For example, video encoder 200 may encode one or more syntax elements, such as one or more flags, for each entry of a predictive palette indicating whether the respective predictive palette entries are reused in the current palette (e.g., whether pixel values in a palette of another CU are reused by the current palette). In this example, video encoder 200 may encode a flag having a value equal to one for a given entry when the entry is a predicted value from a predictive palette (e.g., a corresponding entry of a palette associated with a neighboring CU). Video encoder 200 may encode a flag having a value equal to zero for a particular entry to indicate that the particular entry is not predicted from a palette of another CU. In this example, video encoder 200 may also encode additional data indicating the value of the non-predicted palette entry.

In the example of FIG. 5, second palettes 1920 includes four entries 2080-2140 having entry index value 1, entry index value 2, entry index value 3, and entry index value 4, respectively. Entries 2080-2140 relate the index values to pixel values including pixel value A, pixel value B, pixel value C, and pixel value D, respectively. Video encoder 200 and/or video decoder 300 may use any of the above-described techniques to locate first CU 1800 for purposes of palette prediction and copy entries 1-3 of first palettes 1840 to entries 1-3 of second palettes 1920 for coding second CU 1880. In this way, video encoder 200 and/or video decoder 300 may determine second palettes 1920 based on first palettes 1840. In addition, video encoder 200 and/or video decoder 300 may code data for entry 4 to be included within second palettes 1920. Such information may include the number of palette entries not predicted from a predictor palette and the pixel values corresponding to those palette entries.

In some examples, according to aspects of this disclosure, one or more syntax elements may indicate whether palettes, such as second palettes 1920, are predicted entirely from a predictive palette (shown in FIG. 5 as first palettes 1840, but which may be composed of entries from one or more blocks) or whether particular entries of second palettes 1920 are predicted. For example, an initial syntax element may indicate whether all of the entries are predicted. If the initial syntax element indicates that not all of the entries are predicted (e.g., a flag having a value of 0), one or more additional syntax elements may indicate which entries of second palettes 1920 are predicted from the predictive palette.

According to some aspects of this disclosure, certain information associated with palette prediction may be inferred from one or more characteristics of the data being coded. That is, rather than video encoder 200 encoding syntax elements (and video decoder 300 decoding such syntax elements), video encoder 200 and video decoder 300 may perform palette prediction based on one or more characteristics of the data being coded.

Figure 6:
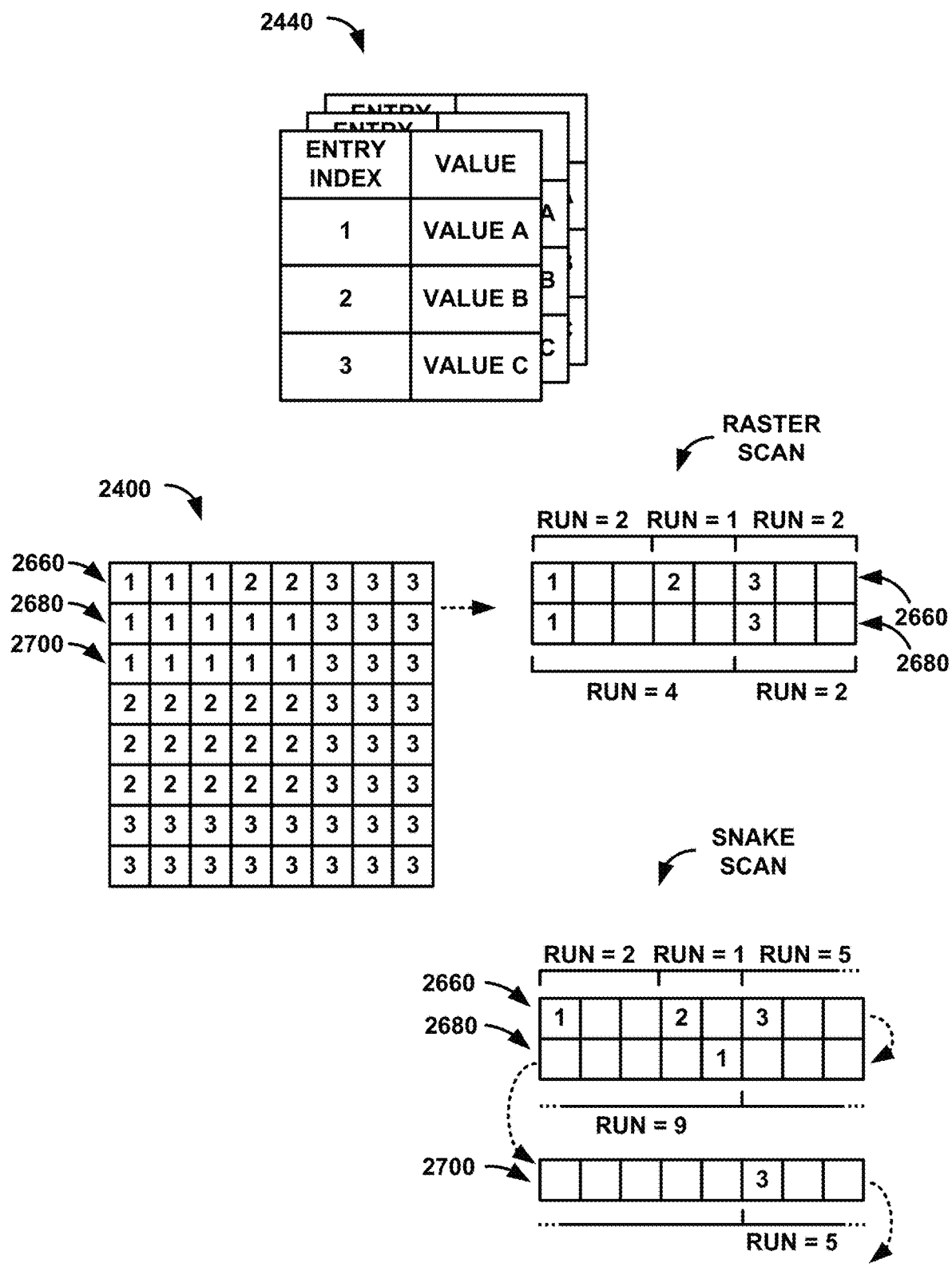
FIG. 6 is a conceptual diagram illustrating an example of determining indices to a palette for a block of pixels, consistent with techniques of this disclosure.

FIG. 6 is a conceptual diagram illustrating an example of determining indices to a palette for a block of pixels, consistent with techniques of this disclosure. For example, FIG. 6 includes a map 2400 of index values (values 1, 2, and 3) that relate respective positions of pixels associated with the index values to an entry of palettes 2440. Palettes 2440 may be determined in a similar manner as first palettes 1840 and second palettes 1920 described above with respect to FIG. 5.

Again, the techniques of FIG. 6 are described in the context of video encoder 200 (FIG. 1 and FIG. 3) and video decoder 300 (FIG. 1 and FIG. 4) and with respect to the HEVC video coding standard for purposes of explanation. However, it should be understood that the techniques of this disclosure are not limited in this way, and may be applied by other video coding processors and/or devices in other video coding processes and/or standards (e.g., VVC).

While map 2400 is illustrated in the example of FIG. 6 as including an index value for each pixel position, it should be understood that in other examples, not all pixel positions may be associated with an index value relating the pixel value to an entry of palettes 2440. That is, as noted above, in some examples, video encoder 200 may encode (and video decoder 300 may obtain, from an encoded bitstream) an indication of an actual pixel value (or its quantized version) for a position in map 2400 if the pixel value is not included in palettes 2440.

In some examples, video encoder 200 and video decoder 300 may be configured to code an additional map indicating which pixel positions are associated with index values. For example, assume that the (i, j) entry in the map corresponds to the (i, j) position of a CU. Video encoder 200 may encode one or more syntax elements for each entry of the map (i.e., each pixel position) indicating whether the entry has an associated index value. For example, video encoder 200 may encode a flag having a value of one to indicate that the pixel value at the (i, j) location in the CU is one of the values in palettes 2440. Video encoder 200 may, in such an example, also encode a palette index (shown in the example of FIG. 6 as values 1-3) to indicate that pixel value in the palette and to allow video decoder 300 to reconstruct the pixel value. In instances in which palettes 2440 include a single entry and associated pixel value, video encoder 200 may skip the signaling of the index value. Video encoder 200 may encode the flag to have a value of zero to indicate that the pixel value at the (i, j) location in the CU is not one of the values in palettes 2440. In this example, video encoder 200 may also encode an indication of the pixel value for use by video decoder 300 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 200 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 300 may obtain the syntax elements indicating a run from an encoded bitstream and use the data to determine the number of consecutive locations that have the same pixel or index value.

The number of indices that may be included in a run may be impacted by the scan order. For example, consider a raster scan of rows 2660, 2680, and 2700 of map 2400. Assuming a horizontal, left to right scan direction (such as a raster scanning order), row 2660 includes three index values of "1," two index values of "2," and three index values of "3." Row 2680 includes five index values of "1" and three index values of "3." In this example, for row 2660, video encoder 200 may encode syntax elements indicating that the first value of row 2660 (the leftmost value of the row) is 1 with a run of 2, followed by an index value of 2 with a run of 1, followed by an index value of 3 with a run of 2. Following the raster scan, video encoder 200 may then begin coding row 2680 with the leftmost value. For example, video encoder 200 may encode syntax elements indicating that the first value of row 2680 is 1 with a run of 4, followed by an index value of 3 with a run of 2. Video encoder 200 may proceed in the same manner with row 2700.

Hence, in the raster scan order, the first index of a current line may be scanned directly after the last index of a previous line. However, in some examples, it may not be desirable to scan the indices in a raster scan order. For instance, it may not be desirable to scan the indices in a raster scan order where a first line of a block of video data (e.g., row 2660) includes a first pixel adjacent to a first edge of the block of video data (e.g., the left most pixel of row 2660, which has an index value of 1) and a last pixel adjacent to a second edge of the block of video data (e.g., the right most pixel of row 2660, which has an index value of 3), a second line of the block of video data (e.g., row 2680) includes a first pixel adjacent to the first edge of the block of video data (e.g., the left most pixel of row 2680, which has an index value of 1) and a last pixel adjacent to the second edge of the block of video data (e.g., the right most pixel of row 2680, which has an index value of 3), the last pixel of the first line is adjacent to the last pixel of the second line, and the first edge and the second edge are parallel, and the last pixel in the first line has the same index value as the last pixel in the second line, but has a different index value from the first pixel in the second line. This situation (i.e., where the index value of the last pixel in the first line is the same as the last pixel in the second line, but different from the first pixel in the second line) may occur more frequently in computer generated screen content than other types of video content.

In some examples, video encoder 200 may utilize a snake scan order (e.g., a traverse scan order) when encoding the indices of the map. For instance, video encoder 200 may scan the last pixel of the second line directly after the last pixel of the first line. In this way, video encoder 200 may improve the efficiency of run-length coding.

For example, as opposed to using a raster scan order, video encoder 200 may use a snake scan order to code the values of map 2400. In an example for purposes of illustration, consider rows 2660, 2680, and 2700 of map 2400. Using a snake scan order (such as a snake scanning order), video encoder 200 may code the values of map 2400 beginning with the left position of row 2660, proceeding through to the right most position of row 2660, moving down to the right most position of row 2680, proceeding through to the left most position of row 2680, and moving down to the left most position of row 2700. For instance, video encoder 200 may encode one or more syntax elements indicating that the first position of row 2660 is one and that the next run of two consecutive entries in the scan direction are the same as the first position of row 2660.

Video encoder 200 may encode one or more syntax elements indicating that the next position of row 2660 (i.e., the fourth position, from left to right) is two and that the next consecutive entry in the scan direction is the same as the fourth position of row 2660. Video encoder 200 may encode one or more syntax elements indicating that the next position of row 2660 (i.e., the sixth position) is three and that the next run of five consecutive entries in the scan direction are the same as the sixth position of row 2660. Video encoder 200 may encode one or more syntax elements indicating that the next position in the scan direction (i.e., the fourth position of row 2680, from right to left) of row 2680 is one and that the next run of nine consecutive entries in the scan direction are the same as the fourth position of row 2680.

In this way, by using a snake scan order, video encoder 200 may encode longer length runs, which may improve coding efficiency. For example, using the raster scan, the final run of row 2660 (for the index value 3) is equal to 2. Using the snake scan, however, the final run of row 2660 extends into row 2680 and is equal to 5.

Video decoder 300 may receive the syntax elements described above and reconstruct rows 2660, 2680, and 2700. For example, video decoder 300 may obtain, from an encoded bitstream, data indicating an index value for a position of map 2400 currently being coded. Video decoder 300 may also obtain data indicating the number of consecutive positions in the scan order having the same index value.

Figure 9:
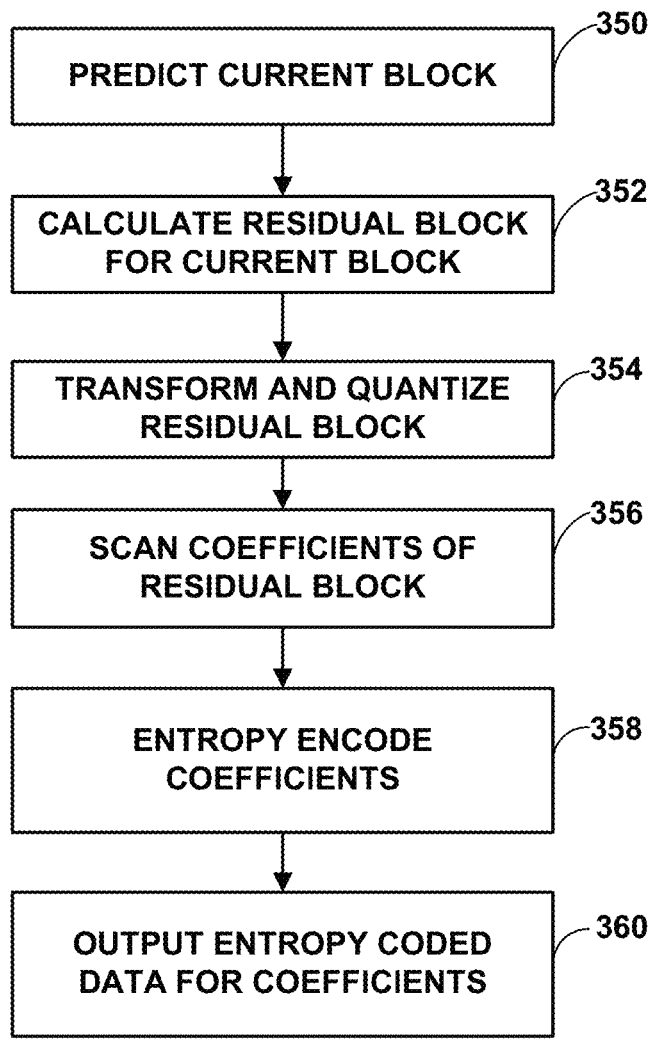
FIG. 9 is a flowchart illustrating an example method for decoding a current block of video data.

FIG. 9 is a flowchart illustrating an example method for encoding a current block. The current block may comprise a current CU. Although described with respect to video encoder 200 (FIGS. 1 and 3), it should be understood that other devices may be configured to perform a method similar to that of FIG. 9.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360). For instance, and in accordance with one or more techniques of this disclosure, video encoder 200 may encode syntax elements for the current block using the index groups described herein.

Figure 10:
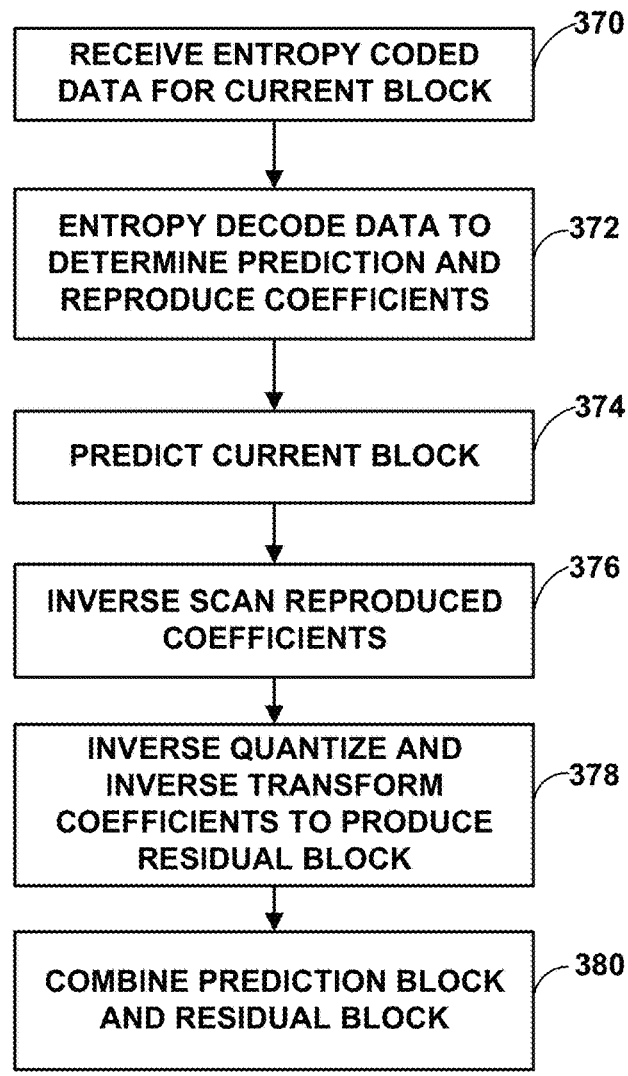
FIG. 10 is a flowchart illustrating an example method for decoding a current block of video data.

FIG. 10 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 10.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). For instance, and in accordance with one or more techniques of this disclosure, video decoder 300, may decode syntax elements for the current block using the index groups described herein. Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 11:
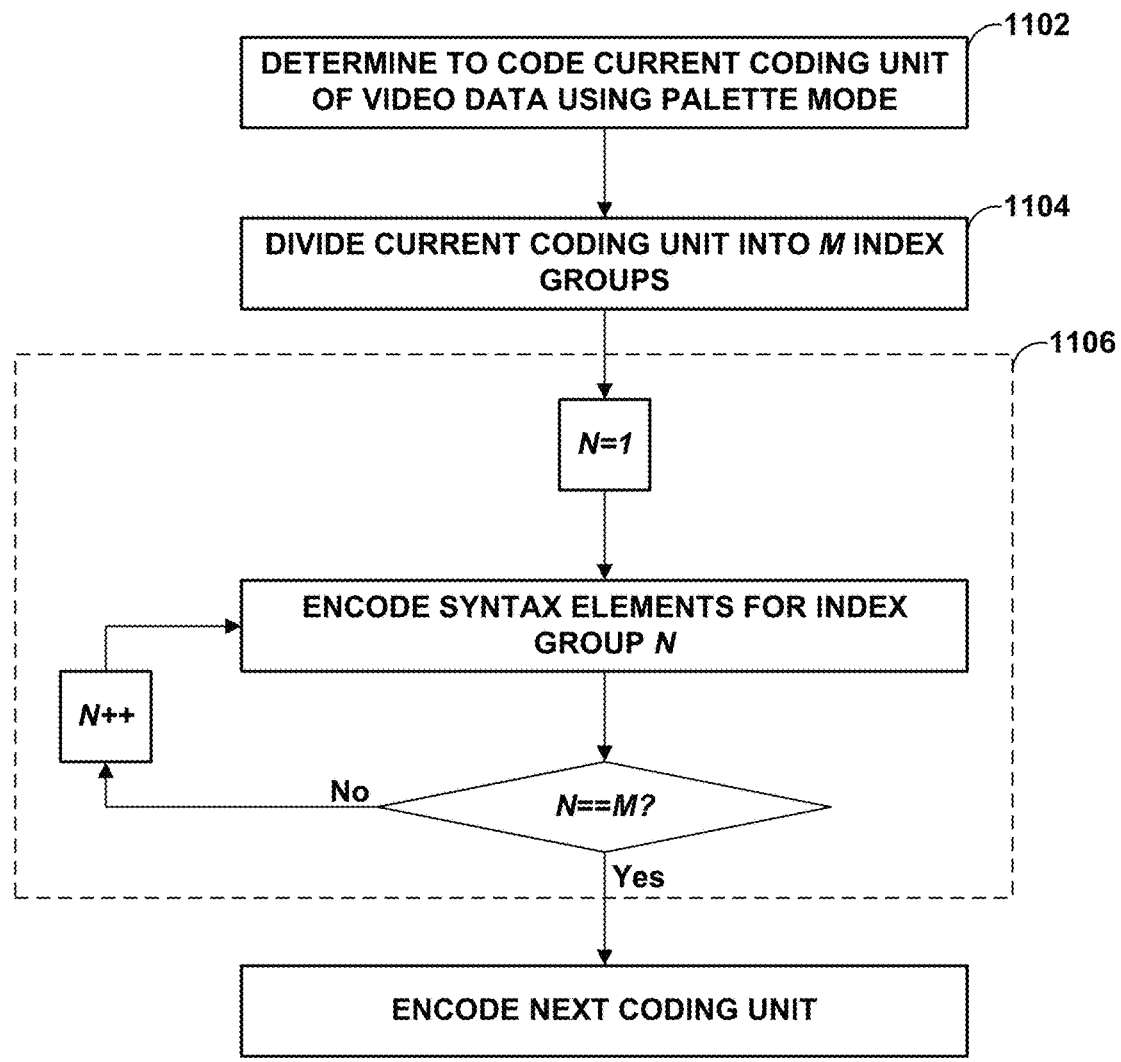
FIG. 11 is a flowchart illustrating an example method for encoding a current block of video data using palette mode coding, in accordance with one or more techniques of this disclosure.

FIG. 11 is a flowchart illustrating an example method for encoding a current block of video data using palette mode coding, in accordance with one or more techniques of this disclosure. The current block may comprise a current CU. Although described with respect to video encoder 200 (FIGS. 1 and 3), it should be understood that other devices may be configured to perform a method similar to that of FIG. 11.

Video encoder 200 may determine to code a current coding unit (CU) using palette mode coding (1102). For instance, mode selection unit 202 of video encoder 200 may analyze samples of the current CU using various rate-distortion techniques and determine, based on the analysis, to code the current CU using palette mode coding. In some examples, video encoder 200 may encode, in a coded video bitstream, an indication that the current CU is coded using palette mode. For instance, entropy encoding unit 220 may encode a syntax element (e.g. a flag such as pred_mode_plt_flag) indicating that the current CU is coded using palette mode.

Video encoder 200 may divide the current CU into M index groups (1104). For instance, where the current CU is an 8 sample by 8 sample block of video data, intra prediction unit 226 may divide the current CU into four index groups of sixteen samples each.

Each of the index groups may include a set of sequential samples in a scan order. As discussed above, the scan order may be raster, snake, or any other suitable scan order. In some examples, all of the samples for an index group may be in a single row (or column) of the CU. In other examples, the samples in a single index group may span multiple rows (or columns).

Video encoder 200 may sequentially parse (e.g., encode), in a video bitstream, syntax elements for each of the M index groups (1106). For instance, where there are four index groups (i.e., where M=4), intra prediction unit 226 may cause entropy encoding unit 220 to first encode syntax elements necessary for construction of samples of a first index group, then cause entropy encoding unit 220 to encode syntax elements necessary for construction of samples of a second index group, then cause entropy encoding unit 220 to encode syntax elements necessary for construction of samples of a third index group, and then cause entropy encoding unit 220 to encode syntax elements necessary for construction of samples of a fourth index group.

Intra prediction unit 226 may sequentially reconstruct (e.g., as part of a reconstruction loop) the samples of the index groups based at least on their respective syntax elements. For instance, intra prediction unit 226 may utilize a common palette for all index groups, reconstruct samples of a first index group based on the common palette and syntax elements for the first index group, . . . , and reconstruct samples of an Nth index group based on the common palette and syntax elements for the Nth index group. Intra prediction unit 226 may encode one or more syntax elements that represent the common palette for the current CU.

The syntax elements necessary for construction of pixels in a particular index group may include one or more of: one or more syntax elements that indicate indices in an array of current palette entries (e.g., palette_idx_idc), one or more syntax elements that represent values of escape samples in the particular index group (e.g., palette_escape_val), and/or one or more syntax elements that specify whether an index of a respective sample is the same as an index of a previous scanned sample (e.g., index_copy_flag).

In some examples, video encoder 200 may encode syntax elements used for reconstruction of all of the index groups prior to encoding syntax elements for any particular index group. For instance, prior to encoding the syntax elements necessary for construction of pixels in a first index group, entropy encoding unit 220 may encode syntax elements commonly used (e.g., shared) by all index groups. Some examples of syntax elements that are commonly used by all index groups include a syntax element that indicates whether a transpose process is applied to palette indices of a palette for the current block of video data (e.g., palette_transpose_f-lag); one or more syntax elements related to delta quantization parameter (QP) and/or chroma QP offsets for the current block of video data (e.g., one or both of a syntax element that indicates an absolute value of a difference between a QP of the current block and a predictor of the QP of the current block and a syntax element that indicates a sign of the difference between the QP of the current block and the predictor of the QP of the current block); one or more syntax elements that indicate a number of zeros that precede a non-zero entry in an array that indicates whether entries from a predictor palette are reused in the current palette (e.g., palette_predictor_run); a syntax element that indicates a number of entries in the current palette that are explicitly signalled (e.g., num_signalled_palette_entries); one or more syntax elements that each indicate a value of a component in an entry in the current palette (e.g., palette_entry); and a syntax element that indicates whether the current block of video data includes at least one escape coded sample (e.g., palette_escape val_present_flag).

In some examples, intra prediction unit 226 may cause entropy encoding unit 220 to code the syntax elements that specify whether an index of a respective sample is the same as an index of a previous scanned sample using context based coding (e.g., context-adaptive binary arithmetic coding (CABAC)) with a context determined based on one or more parameters. As one example, intra prediction unit 226 and/or entropy encoding unit 220 may determine the context based on a run type, such as the last parsed run type.

Figure 12:
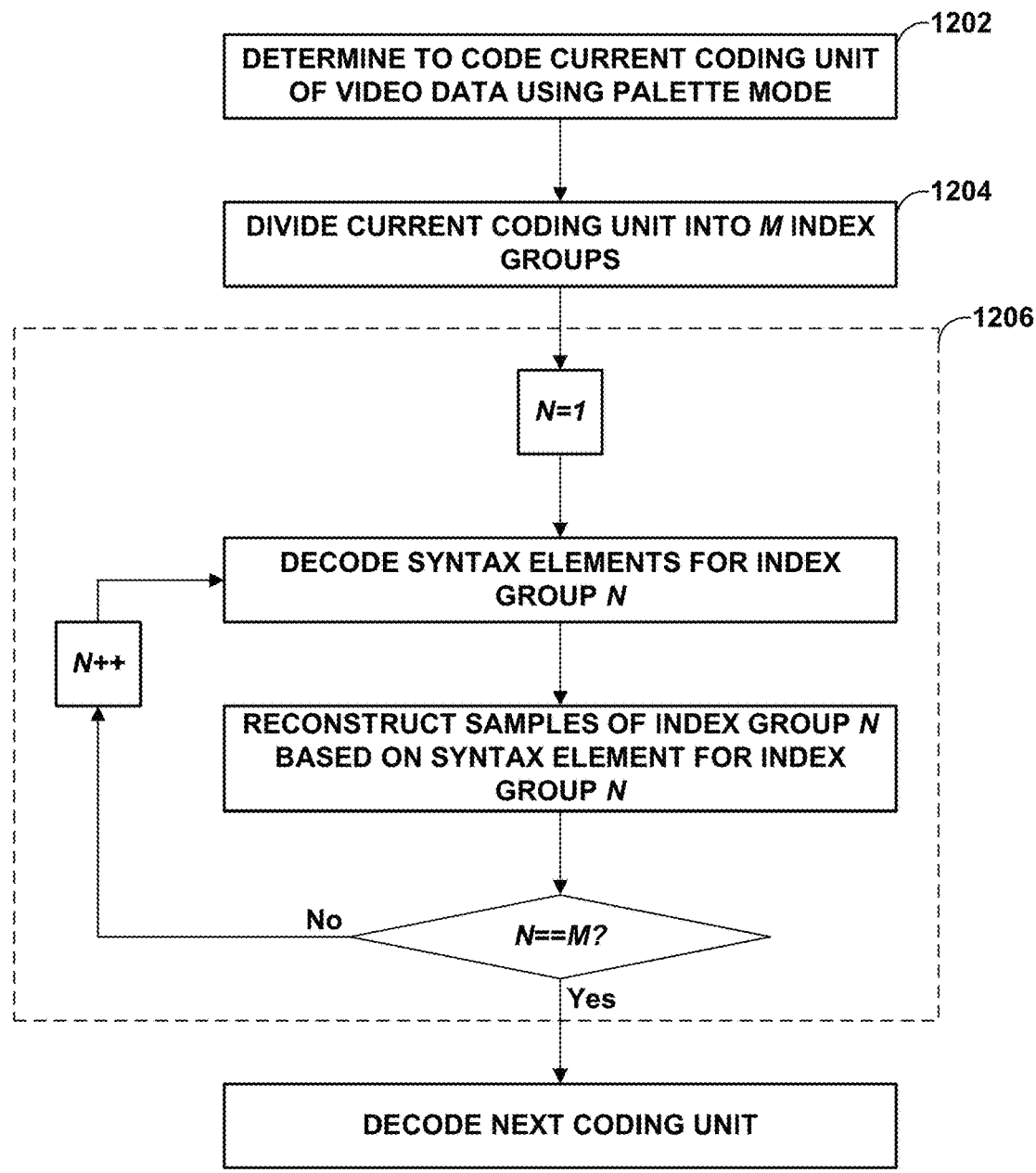
FIG. 12 is a flowchart illustrating an example method for decoding a current block of video data using palette mode coding, in accordance with one or more techniques of this disclosure.

FIG. 12 is a flowchart illustrating an example method for decoding a current block of video data using palette mode coding, in accordance with one or more techniques of this disclosure. The current block may comprise a current CU. Although described with respect to video decoder 300 (FIGS. 1 and 4), it should be understood that other devices may be configured to perform a method similar to that of FIG. 12.

Video decoder 300 may determine to code current coding unit (CU) using palette mode coding (1202). For instance, entropy decoding unit 302 of video decoder 300 may decode, from a coded video bitstream, an indication that the current CU is coded using palette mode. For instance, entropy decoding unit 302 may decode a syntax element (e.g. a flag such as pred_mode_plt_flag) indicating that the current CU is coded using palette mode.

Video decoder 300 may divide the current CU into M index groups (1204). For instance, where the current CU is an 8 sample by 8 sample block of video data, intra prediction unit 318 may divide the current CU into four index groups of sixteen samples each.

Each of the index groups may include a set of sequential samples in a scan order. As discussed above, the scan order may be raster, snake, or any other suitable scan order. In some examples, all of the samples for an index group may be in a single row (or column) of the CU. In other examples, the samples in a single index group may span multiple rows (or columns).

Video decoder 300 may sequentially parse (e.g., decode), from a video bitstream, syntax elements for each of the M index groups and sequentially decode/reconstruct the samples of the index groups (1206). For instance, where there are four index groups (i.e., where M=4), intra prediction unit 318 may first receive, from entropy decoding unit 302, syntax elements necessary for construction of samples of a first index group, then receive syntax elements necessary for construction of samples of a second index group, then receive syntax elements necessary for construction of samples of a third index group, and then receive syntax elements necessary for construction of samples of a fourth index group.

Intra prediction unit 318 may sequentially reconstruct the samples of the index groups based at least on their respective syntax elements. For instance, intra prediction unit 318 may utilize a common palette for all index groups, reconstruct samples of a first index group based on the common palette and syntax elements for the first index group, . . . , and reconstruct samples of an Nth index group based on the common palette and syntax elements for the Nth index group. Intra prediction unit 318 may construct the common palette based on syntax elements signalled for the current CU.

The syntax elements necessary for construction of pixels in a particular index group may include one or more of: one or more syntax elements that indicate indices in an array of current palette entries (e.g., palette_idx_idc), one or more syntax elements that represent values of escape samples in the particular index group (e.g., palette_escape_val), and/or one or more syntax elements that specify whether an index of a respective sample is the same as an index of a previous scanned sample (e.g., index_copy_flag).

In some examples, video decoder 300 may decode (e.g., parse) syntax elements used for reconstruction all of the index groups prior to decoding (e.g., parsing) syntax elements for any particular index group. For instance, prior to decoding the syntax elements necessary for construction of pixels in a first index group, entropy decoding unit 302 may decode syntax elements commonly used (e.g., shared) by all index groups. Some examples of syntax elements that are commonly used by all index groups include a syntax element that indicates whether a transpose process is applied to palette indices of a palette for the current block of video data (e.g., palette_transpose_flag); one or more syntax elements related to delta quantization parameter (QP) and/or chroma QP offsets for the current block of video data (e.g., one or both of a syntax element that indicates an absolute value of a difference between a QP of the current block and a predictor of the QP of the current block and a syntax element that indicates a sign of the difference between the QP of the current block and the predictor of the QP of the current block); one or more syntax elements that indicate a number of zeros that precede a non-zero entry in an array that indicates whether entries from a predictor palette are reused in the current palette (e.g., palette_predictor_run); a syntax element that indicates a number of entries in the current palette that are explicitly signalled (e.g., num_signalled_palette_entries); one or more syntax elements that each indicate a value of a component in an entry in the current palette (e.g., palette_entry); and a syntax element that indicates whether the current block of video data includes at least one escape coded sample (e.g., palette_escape_val_present_flag).

By first decoding the syntax elements used by all the index groups (e.g., the syntax elements used to construct the palette) and then separately grouping the decoding of the syntax elements for the index groups, video decoder 300 may begin the construction process of some samples of the current CU without having to wait to complete decoding of all of the syntax elements of the current CU. In this way, the techniques of this disclosure may decrease the amount of time required and/or the delay introduced by the decoding process.

In some examples, entropy decoding unit 302 may decode the syntax elements that specify whether an index of a respective sample is the same as an index of a previous scanned sample using context based coding (e.g., context-adaptive binary arithmetic coding (CABAC)) with a context determined based on one or more parameters. As one example, entropy decoding unit 302 may determine the context based on a run type, such as the last parsed run type.

The following numbered examples may illustrate one or more aspects of the disclosure:

Example 1. A method of coding video data, the method comprising: dividing a current block of video data into a plurality of index groups, the current block of video data coded using palette mode; parsing syntax elements for a first index group of the plurality of index groups; after parsing the syntax elements for the first index group, parsing syntax elements for a second index group of the plurality of index groups; and decoding the current block of video data based on the syntax elements for the first index group and the syntax elements for the second index group.

Example 2. The method of example 1, wherein the current block of video data is a current coding unit (CU) of video data.

Example 3. The method of any combination of example 1 or example 2, wherein parsing the syntax elements for the first index group comprises parsing syntax elements for the first index group that are necessary for construction of pixels in the first index group.

Example 4. The method of any combination of examples 1-3, wherein parsing the syntax elements for the second index group comprises parsing syntax elements for the second index group that are necessary for construction of pixels in the second index group.

Example 5. The method of any combination of examples 1-4, wherein syntax elements necessary for construction of pixels in an index group include one or more of: a syntax element that indicates whether a transpose process is applied to palette indices of a palette for the current block of video data; one or more syntax elements related to delta quantization parameter (QP) and/or chroma QP offsets for the current block of video data; one or more syntax elements that indicate a number of zeros that precede a non-zero entry in an array that indicates whether entries from a predictor palette are reused in the current palette; a syntax element that indicates a number of entries in the current palette that are explicitly signalled; one or more syntax elements that each indicate a value of a component in an entry in the current palette; a syntax element that indicates whether the current block of video data includes at least one escape coded sample; a syntax element that indicates a number of indices in the current palette that are explicitly signalled or inferred; and one or more syntax elements that indicate indices in an array of current palette entries.

Example 6. The method of example 5, wherein one or more of: the syntax element that indicates whether the transpose process is applied to palette indices of the current block of video data comprises a palette_transpose_flag syntax element, the one or more syntax elements related to delta QP comprise one or both of a syntax element that indicates an absolute value of a difference between a QP of the current block and a predictor of the QP of the current block and a syntax element that indicates a sign of the difference between the QP of the current block and the predictor of the QP of the current block, the one or more syntax elements that indicate a number of zeros that precede a non-zero entry in an array that indicates whether entries from a predictor palette are reused in the current palette comprise one or more palette_predictor_run syntax elements, the syntax element that indicates a number of entries in the current palette that are explicitly signalled comprises a num_signalled_palette_entries syntax element, the one or more syntax elements that each indicate a value of a component in an entry in the current palette comprise one or more palette_entry syntax elements, the syntax element that indicates whether the current block of video data includes at least one escape coded sample comprises palette_escape_val_present_flag, the syntax element that indicates a number of indices in the current palette that are explicitly signalled or inferred comprise a num_palette_indices_idc syntax element, and the one or more syntax elements that indicate indices in an array of current palette entries comprise one or more palette_index_idc syntax elements.

Example 7. The method of any combination of examples 1-6, wherein syntax elements necessary for construction of pixels in an index group include one or more of syntax elements included in the Palette syntax of section 7.3.8.13 of ITU-T H.265/High Efficiency Video Coding (HEVC) (February 2018).

Example 8. The method of any combination of examples 1-7, wherein parsing the syntax elements for a particular index group of the plurality of index groups comprises: parsing syntax elements that indicate a number of palette indices and values for all pixels in the particular index group; parsing, after parsing the syntax elements that indicate a number of palette indices and values for all pixels in the particular index group and for respective pixels in the particular index group, respective syntax element indicating whether an index value of the respective pixel is the same as a previous index; responsive to determining that the index value of the respective pixel is not the same as the previous index, parsing, after parsing the syntax elements indicating whether the index values of the pixels are the same as previous indices, a syntax element indicating a run type.

Example 9. The method of example 8, wherein: the respective syntax element indicating whether the index value of the respective pixel is the same as the previous index comprises an index_copy_flag; the syntax element indicating the run type comprises a run_type_flag syntax element.

Example 10. The method of any combination of examples 1-9, wherein parsing the syntax elements for the first index group comprises: parsing, for a first pixel in the first index group, a syntax element indicating a run type; and parsing one or more syntax elements indicating a run length.

Example 11. The method of example 10, wherein the run length is binarized using a unary codeword.

Example 12. The method of any of examples 1-11, wherein coding comprises decoding.

Example 13. The method of any of examples 1-12, wherein coding comprises encoding.

Example 14. A device for coding video data, the device comprising one or more means for performing the method of any of examples 1-13.

Example 15. The device of example 14, wherein the one or more means comprise one or more processors implemented in circuitry.

Example 16. The device of any of examples 14 and 15, further comprising a memory to store the video data.

Example 17. The device of any of examples 14-16, further comprising a display configured to display decoded video data.

Example 18. The device of any of examples 14-17, wherein the device comprises one or more of a camera, a computer, a mobile device, a broadcast receiver device, or a set-top box.

Example 19. The device of any of examples 14-18, wherein the device comprises a video decoder.

Example 20. The device of any of examples 14-19, wherein the device comprises a video encoder.

Example 21. A computer-readable storage medium having stored thereon instructions that, when executed, cause one or more processors to perform the method of any of examples 1-13.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   dividing a current coding unit (CU) of video data into a plurality of index groups, the current CU of video data coded using palette mode;
   parsing one or more syntax elements used for reconstruction of all index groups of the plurality of index groups;
   generating, based on the one or more syntax elements used for reconstruction of all index groups of the plurality of index groups, a palette for the current CU;
   after parsing the one or more syntax elements used for reconstruction of all index groups of the plurality of index groups, parsing syntax elements for a first index group of the plurality of index groups, wherein the syntax elements for the first index group include one or more syntax elements that indicate indices in the palette and one or more syntax elements that represent values of escape samples in the first index group;
   after parsing the syntax elements for the first index group, parsing syntax elements for a second index group of the plurality of index groups, wherein the syntax elements for the second index group include one or more syntax elements that indicate indices in the palette; and
   reconstructing the current CU of video data based on the syntax elements for the first index group and the syntax elements for the second index group, wherein reconstructing comprises:
   reconstructing samples of the first index group based on the palette for the current CU and the syntax elements for the first index group; and
   reconstructing samples of the second index group based the palette for the current CU and the syntax elements for the second index group.

2. The method of claim 1, wherein parsing the syntax elements for the second index group comprises:
   coding, for each respective sample included in the second index group, a syntax element that specifies whether an index of the respective sample is the same as an index of a previous scanned sample.

3. The method of claim 2, wherein coding the syntax element that specifies whether the index of the respective sample is the same as the index of the previous scanned sample comprises:
   coding, using a context determined based on a run type, the syntax element that specifies whether the index of the respective sample is the same as the index of the previous scanned sample.

4. The method of claim 1, wherein parsing the syntax elements for the first index group comprises parsing syntax elements for the first index group that are used for construction of samples in the first index group.

5. The method of claim 4, wherein parsing the syntax elements for the second index group comprises parsing syntax elements for the second index group that are used for construction of samples in the second index group.

6. The method of claim 1, wherein syntax elements for the first index group further include:
   one or more syntax elements that specify whether an index of a respective sample is the same as an index of a previous scanned sample.

7. The method of claim 1, further comprising:
   after parsing the syntax elements for the second index group, parsing syntax elements for a third index group of the plurality of index groups; and
   after parsing the syntax elements for the third index group, parsing syntax elements for a fourth index group of the plurality of index groups.

8. The method of claim 1, wherein parsing the one or more syntax elements used for reconstruction of all index groups of the plurality of index groups, the syntax elements for the first index group, and the syntax elements for the second index group comprises encoding the one or more syntax elements used for reconstruction of all index groups of the plurality of index groups, the syntax elements for the first index group, and the syntax elements for the second index group.

9. The method of claim 1, wherein parsing the one or more syntax elements used for reconstruction of all index groups of the plurality of index groups, the syntax elements for the first index group, and the syntax elements for the second index group comprises decoding the one or more syntax elements used for reconstruction of all index groups of the plurality of index groups, the syntax elements for the first index group, and the syntax elements for the second index group.

10. A device for coding video data, the device comprising a memory configured to store at least a portion of a coded video bitstream; and
one or more processors that are implemented in circuitry and configured to:
  divide a current coding unit (CU) of video data into a plurality of index groups, the current CU of video data coded using palette mode;
  parse one or more syntax elements used for reconstruction of all index groups of the plurality of index groups;
  generate, based on the one or more syntax elements used for reconstruction of all index groups of the plurality of index groups, a palette for the current CU;
  after parsing the one or more syntax elements used for reconstruction of all index groups of the plurality of index groups, parse, via the coded video bitstream, syntax elements for a first index group of the plurality of index groups, wherein the syntax elements for the first index group include one or more syntax elements that indicate indices in the palette and one or more syntax elements that represent values of escape samples in the first index group;
  after parsing the syntax elements for the first index group, parse, via the coded video bitstream, syntax elements for a second index group of the plurality of index groups, wherein the syntax elements for the second index group include one or more syntax elements that indicate indices in the palette; and
  reconstruct the current CU of video data based on the syntax elements for the first index group and the syntax elements for the second index group, wherein, to reconstruct the current CU, the one or more processors are configured to:
    reconstruct samples of the first index group based on the palette for the current CU and the syntax elements for the first index group; and
    reconstruct samples of the second index group based the palette for the current CU and the syntax elements for the second index group.

11. The device of claim 10, wherein, to parse the syntax elements for the second index group, the one or more processors are configured to:
  code, for each respective sample included in the second index group, a syntax element that specifies whether an index of the respective sample is the same as an index of a previous scanned sample.

12. The device of claim 11, wherein, to code the syntax element that specifies whether the index of the respective sample is the same as the index of the previous scanned sample, the one or more processors are configured to:
  code, using a context determined based on a run type, the syntax element that specifies whether the index of the respective sample is the same as the index of the previous scanned sample.

13. The device of claim 10, wherein, to parse the syntax elements for the first index group, the one or more processors are configured to parse syntax elements for the first index group that are used for construction of samples in the first index group.

14. The device of claim 13, wherein, to parse the syntax elements for the second index group, the one or more processors are configured to parse syntax elements for the second index group that are used for construction of samples in the second index group.

15. The device of claim 10, wherein syntax elements for the first index group further include:
  one or more syntax elements that specify whether an index of a respective sample is the same as an index of a previous scanned sample.

16. The device of claim 10, wherein the one or more processors are further configured to:
  parse, after parsing the syntax elements for the second index group, syntax elements for a third index group of the plurality of index groups; and
  parse, after parsing the syntax elements for the third index group, syntax elements for a fourth index group of the plurality of index groups.

17. The device of claim 10, wherein, to parse the one or more syntax elements used for reconstruction of all index groups of the plurality of index groups, the syntax elements for the first index group, and the syntax elements for the second index group, the one or more processors are configured to encode the one or more syntax elements used for reconstruction of all index groups of the plurality of index groups, the syntax elements for the first index group, and the syntax elements for the second index group.

18. The device of claim 10, wherein, to parse the one or more syntax elements used for reconstruction of all index groups of the plurality of index groups, the syntax elements for the first index group, and the syntax elements for the second index group, the one or more processors are configured to decode the one or more syntax elements used for reconstruction of all index groups of the plurality of index groups, the syntax elements for the first index group, and the syntax elements for the second index group.

19. A non-transitory computer-readable storage medium storing instructions that, when executed, cause one or more processors of a video coder to:
  divide a current coding unit (CU) of video data into a plurality of index groups, the current CU of video data coded using palette mode;
  parse one or more syntax elements used for reconstruction of all index groups of the plurality of index groups;
  generate, based on the one or more syntax elements used for reconstruction of all index groups of the plurality of index groups, a palette for the current CU;
  after parsing the one or more syntax elements used for reconstruction of all index groups of the plurality of index groups, parse, via a coded video bitstream, syntax elements for a first index group of the plurality of index groups, wherein the syntax elements for the first index group include one or more syntax elements that indicate indices in the palette and one or more syntax elements that represent values of escape samples in the first index group;

after parsing the syntax elements for the first index group, parse, via the coded video bitstream, syntax elements for a second index group of the plurality of index groups, wherein the syntax elements for the second index group include one or more syntax elements that indicate indices in the palette; and reconstruct the current CU of video data based on the syntax elements for the first index group and the syntax elements for the second index group, wherein the instructions that cause the one or more processors to reconstruct the current CU comprise instructions that cause the one or more processors to:

reconstruct samples of the first index group based on the palette for the current CU and the syntax elements for the first index group; and reconstruct samples of the second index group based the palette for the current CU and the syntax elements for the second index group.

20. A video coding device comprising:

means for dividing a current coding unit (CU) of video data into a plurality of index groups, the current CU of video data coded using palette mode;

means for parsing one or more syntax elements used for reconstruction of all index groups of the plurality of index groups;

means for generating, based on the one or more syntax elements used for reconstruction of all index groups of the plurality of index groups, a palette for the current CU;

means for parsing, after parsing the one or more syntax elements used for reconstruction of all index groups of the plurality of index groups, via the coded video bitstream, syntax elements for a first index group of the plurality of index groups, wherein the syntax elements for the first index group include one or more syntax elements that indicate indices in the palette and one or more syntax elements that represent values of escape samples in the first index group;

means for parsing, after parsing the syntax elements for the first index group, via the coded video bitstream, syntax elements for a second index group of the plurality of index groups, wherein the syntax elements for the second index group include one or more syntax elements that indicate indices in the palette; and means for reconstructing the current CU of video data based on the syntax elements for the first index group and the syntax elements for the second index group, wherein the means for reconstructing comprise:

means for reconstructing samples of the first index group based on the palette for the current CU and the syntax elements for the first index group; and means for reconstructing samples of the second index group based the palette for the current CU and the syntax elements for the second index group.

* * * * *